United States Patent
Honda et al.

(10) Patent No.: US 9,781,474 B2
(45) Date of Patent: Oct. 3, 2017

(54) CONTENT PLAYBACK INFORMATION ESTIMATION APPARATUS AND METHOD AND PROGRAM

(71) Applicant: NIPPON TELEGRAPH AND TELEPHONE CORPORATION, Chiyoda-ku (JP)

(72) Inventors: Hirotada Honda, Musashino (JP); Hiroshi Yamamoto, Musashino (JP); Sorami Nakamura, Musashino (JP); Daisuke Ikegami, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 652 days.

(21) Appl. No.: 14/351,704

(22) PCT Filed: Nov. 1, 2012

(86) PCT No.: PCT/JP2012/078392
§ 371 (c)(1),
(2) Date: Apr. 14, 2014

(87) PCT Pub. No.: WO2013/065804
PCT Pub. Date: May 10, 2013

(65) Prior Publication Data
US 2014/0241699 A1 Aug. 28, 2014

(30) Foreign Application Priority Data

Nov. 2, 2011 (JP) .................................. 2011-241173
Feb. 15, 2012 (JP) .................................. 2012-031125
Jul. 4, 2012 (JP) .................................. 2012-150926

(51) Int. Cl.
*H04N 9/80* (2006.01)
*H04N 21/44* (2011.01)
(Continued)

(52) U.S. Cl.
CPC ... *H04N 21/44004* (2013.01); *H04N 21/2401* (2013.01); *H04N 21/4333* (2013.01)

(58) Field of Classification Search
None
See application file for complete search history.

(56) References Cited

U.S. PATENT DOCUMENTS

2011/0137984 A1* 6/2011 Kim ...................... H04L 65/608
709/203

FOREIGN PATENT DOCUMENTS

JP 2006-174231 6/2006
JP 2006174231 A * 6/2006

OTHER PUBLICATIONS

Extended Search Report issued Dec. 22, 2014 in European Patent Application No. 12846372.6.
(Continued)

*Primary Examiner* — Heather Jones
(74) *Attorney, Agent, or Firm* — Oblon, McClelland, Maier & Neustadt, L.L.P.

(57) ABSTRACT

A content playback information estimation apparatus, for estimating a state on playback of content, that is provided between a distribution server and a terminal in a system in which the distribution server distributes the content to the terminal via a network and the terminal plays the content, the content playback information estimation apparatus including: a unit configured to obtain packet data distributed from the distribution server to the terminal and to store the packet data in a storage unit; a unit configured to estimate a data amount in a buffer of the terminal based on obtained packet data; and a unit configured to estimate a state on playback at each time of the content in the terminal by comparing the estimated data amount with a predetermined threshold.

7 Claims, 18 Drawing Sheets

(51) Int. Cl.
  *H04N 21/24*   (2011.01)
  *H04N 21/433*  (2011.01)

(56) References Cited

OTHER PUBLICATIONS

Daisuke Ikegami, et al., "Playing state estimation method for chunk type video delivery services", Proc. 2 of the IEICE General Conf., Okayama B-11-24, Mar. 20-23, 2012, p. 471 (with English translation).
International Search Report issued Feb. 5, 2013, in PCT/JP12/078392 filed Nov. 1, 2012.
Fujimoto, et al., "Statistical Analysis of Packet delays in the Internet and Its Application to Playout Control for Streaming Applications", IEICE Trans. on Comunications, vol. E00-B, No. 6, NTTH23622, Jun. 2001, 9 pages.
Pantos, et al., "HTTP Live Streaming", IETF Internet-Draft, Sep. 2011, 33 pages.

\* cited by examiner

FIG.15A

■PREREQUISITE

| START THRESHOLD | | th_p | 5 |
|---|---|---|---|
| HALT THRESHOLD | | th_s | 3 |
| RESTART THRESHOLD | | th_r | 4 |
| PLAYBACK TIME | | len_i | 2 |
| TIME OF OBTAINING th_p CHUNKS | | T_0 | 10 |

FIG.15B

WITHIN [ ] IN OBTAINING TIME IS ABSOLUTE VALUE OF TIME

| STATE ESTIMATION TIME T (ABSOLUTE) | ESTIMATED PLAYBACK START TIME (ABSOLUTE) | NUMBER OF PLAYING CHUNKS: i | CHUNK NO. | OBTAINING TIME (RELATIVE) | PLAYBACK TIME | PLAYBACK TIME POINT (ABSOLUTE) | NUMBER n OF CHUNKS IN BUFFER |
|---|---|---|---|---|---|---|---|
| 1 | | 1 | 1 | $t\_1 = 0\ [5]$ | $len\_1 = 2$ | $T = T\_0$ | |
| 2 | | 2 | 2 | $t\_2$ | $len\_2 = 2$ | $T + len\_1 = 12$ | |
| 3 | | 3 | 3 | $t\_3$ | $len\_3 = 2$ | $T + len\_2 = 14$ | |
| 4 | | 4 | 4 | $t\_4$ | $len\_4 = 2$ | $T + len\_3 = 16$ | |
| 5 $T\_0$ | $T\_0 = 10$ | 5 | 5 | $t\_5 = 5\ [10]$ | $len\_5 = 2$ | $T + len\_4 = 18$ | $n = th\_p = 5$ |
| 6 | | 6 | 6 | $t\_6 = 7\ [12]$ | $len\_6 = 2$ | $T + len\_5 = 20$ | |
| 7 | | 7 | 7 | $t\_7 = 12\ [17]$ | $len\_7 = 2$ | $T + len\_6 = 22$ | |
| 8 | | 8 | 8 | $t\_8 = 13\ [18]$ | $len\_8 = 2$ | $T + len\_7 = 24$ | |
| 9 | | 9 | 9 | $t\_9 = 14\ [19]$ | $len\_9 = 2$ | $T + len\_8 = 26$ | |
| 10 | | 10 | 10 | $t\_10 = 15\ [20]$ | $len\_10 = 2$ | | |
| 11 | | | 11 | $t\_11$ | $len\_11 = 2$ | | |
| 12 | | | 12 | $t\_12$ | $len\_12 = 2$ | | | ns # CONTENT PLAYBACK INFORMATION ESTIMATION APPARATUS AND METHOD AND PROGRAM

TECHNICAL FIELD

The present invention relates to a content playback information estimation apparatus, a method and a program. More particularly, the present invention relates to a content playback information estimation apparatus, a method and a program for performing estimation of playback quality of content, such as a video, of a progressive download type in a system for distributing content data via a network.

BACKGROUND ART

In recent years, bandwidths of communication networks are becoming wider, so that a greater amount of traffic has become circulated via the Internet. Especially, content distribution systems of the progressive download type are in widespread use, in which data processing is performed in parallel while downloading content having a large file size. In such a content distribution form, since data is transmitted via the network, data does not arrive at the terminal with a constant rate due to delay variation, packet loss, retransmission and the like, so that fluctuation occurs in transmission timing when data arrives. Therefore, there are many cases in which a mechanism is used in order to hide the effect of the network for the upper layer application by preparing a playback buffer for absorbing the fluctuation in the terminal side.

The content distribution form is characterized in that a certain amount of buffering (initial buffering amount) is necessary until start of processing, and the effect of the network can be relieved by increasing the buffer amount. On the other hand, the time until start of data processing becomes long, so that the response becomes worse. Therefore, it is necessary to set an initial buffer amount of a proper size in consideration of various situations. For example, there is a method in which the initial buffer amount is changed based on transfer delay time of packets (refer to a non-patent document 1, for example).

On the other hand, in a case where throughput of the network temporarily becomes lower than the processing speed of the content data, the playback buffer becomes lower than a predetermined amount (playback halt threshold), so that there is a case where playback is halted. The halt of playback causes a big effect on user sensory quality of the content. But, since the conventional technique cannot solve the problem, a technique is required for estimating and ascertaining playback halt states of content.

Also, as distribution methods of content, there are many schemes for, even for a single piece of content, dividing content into a plurality of units for distribution. In these distribution schemes, each divided unit is called a chunk, and content data is stored in the playback buffer in units of chunks. That is, the playback buffer is managed by the number of chunks or the playback time length for the stored chunks.

RELATED ART DOCUMENT

[Non-patent document 1] Kouhei Fujimoto, Shingo Ata, Masayuki Murata, "Statistical Analysis of Packet delays in the Internet and Its Application to Playout Control for Streaming Applications," IEICE TRANSE. ON COMMUNICATION, VOL. E00-B, NO. 6 June 2001

SUMMARY OF THE INVENTION

Problem to be Solved by the Invention

For estimating the playback halt state, two patterns can be considered, which are a case in which the estimation is performed in the inside of the terminal and a case where the estimation is performed outside the terminal.

In the case for performing the estimation in the terminal, a program is actually run in the inside of the terminal so as to directly obtain and use data. Thus, the accuracy can be improved. However, it is supposed that a built-in tailored for the application and modification of a client program become necessary. It is difficult to increase supported applications, so this method lacks versatility.

On the other hand, in the case for performing estimation in the outside of the terminal, since the estimation is performed based on packet data transferred to the terminal, this method can be applied to any application, and versatility is high. However, on the other hand, it is necessary to perform estimation of the playback halt state by simulating processing in the client program. A method can be considered to enhance estimation accuracy for a particular application. But, there is a drawback that versatility which is an advantage in estimation in the outside is lost. Therefore, it is a problem to enhance accuracy of playback state while keeping versatility.

Also, in a case where it is estimated that playback halt occurs based on capture data, it cannot be determined whether the occurrence of the playback halt is caused by the network or by behavior of a user. Thus, there is a problem in that it is difficult to determine the cause of quality deterioration. For example, there is a possibility that the cause of the quality deterioration is erroneously determined to be in the network despite absence of any problem in the network. Therefore, in estimation of playback halt, it is a problem to be able to identify cause of playback halt, more specifically, to determine whether playback halt is caused by user operation of momentary pause of playback or the halt is a natural halt caused by deterioration of function in the network or a server.

The present invention is contrived in view of the above-mentioned problem, and an object of the present invention is, in a system for providing a service for receiving and playing content data distributed via a network, to provide a content playback information estimation apparatus, a method and a program for performing estimation of a playback halt state in a terminal that receives and plays content data in the system by performing packet capturing and analysis on a distribution route without modifying a distribution side (distribution server) and a receiving side (playback terminal) in a content distribution system.

Also, in estimation of a playback halt state of content data in units of chunks received by the terminal via a network, an object of the present invention is to provide a content playback information estimation apparatus, a method and a program that can identify a playback halt cause and reflect the cause in estimation of the playback halt state.

Means for Solving the Problem

According to an embodiment of the present invention, a content playback information estimation apparatus is provided, for estimating a state on playback of content, being provided between a distribution server and a terminal in a system in which the distribution server distributes the content to the terminal via a network and the terminal plays the content, the content playback information estimation apparatus including:

a unit configured to obtain packet data distributed from the distribution server to the terminal and to store the packet data in a storage unit;

a unit configured to estimate a data amount in a buffer of the terminal based on obtained packet data; and a unit configured to estimate a state on playback at each time of the content in the terminal by comparing the estimated data amount with a predetermined threshold.

According to an embodiment of the present invention, a content playback information estimation apparatus is provided, in a system, for estimating a playback halt state of content data in a terminal, the content playback information estimation apparatus including:

a packet information obtaining unit configured to obtain packet information sent and received via a network;

a content received amount estimation unit configured to estimate time-series information of an amount of content data received at each time in a playback terminal based on time-series information of the packet information;

a playback start time estimation unit configured to estimate a time period required for starting playback in the playback terminal by using the amount of content data estimated by the content received amount estimation unit;

a playback state estimation unit configured to estimate, by using the amount of content data, whether a state in the playback terminal is in a playback state or in a halt state at each time based on a data amount that is consumed by a playback application of the playback terminal at each time period after start of playback; and a playback halt time estimation unit configured, when the playback state estimation unit determines the state is in the halt state, to estimate a time at which playback is halted and a length of the halt, wherein the system including a distribution server for performing content data distribution via the network, and the playback terminal for playing the content data received from the distribution server while storing the content data, the playback terminal stores the content data in a playback buffer, starts playback when content data of an initial buffer amount is stored in the playback buffer, reads data required for playback from the playback buffer during playback, halts playback when a buffer amount stored in the playback buffer falls below a playback halt threshold, and starts playback when the buffer amount stored in the playback buffer exceeds a playback start threshold.

According to an embodiment of the present invention, a content playback information estimation apparatus is provided for estimating playback/halt time of content in a system for distributing content to a terminal in units of chunks from a distribution server via a network, the content playback information estimation apparatus being provided between the distribution server and the terminal, the content playback information estimation apparatus including:

a packet data obtaining unit configured to obtain packet data exchanged between the distribution server and the terminal, and a content list, and to store the packet data and the content list in a storage unit;

a chunk time length estimation unit configured to obtain a playback time length for each chunk that is passed to a playback application of the terminal based on the packet data obtained from the storage unit or an identifier of content and data of chunks in the content list;

a chunk obtaining time estimation unit configured to obtain the packet data from the storage unit and to obtain a chunk obtaining time at which the chunk is passed to the playback application of the terminal; and a playback state estimation unit configured to set, beforehand, a threshold th_p of the number of chunks in a buffer of the terminal for starting playback of content, a threshold th_s of the number of chunks for halting playback, and a threshold th_r of the number of chunks for restarting playback, and to refer to the packet data of the storage unit and the content list to obtain the number of chunks that is currently stored in the buffer of the terminal based on the chunk playback time length obtained by the chunk time length estimation unit and the chunk obtaining time obtained by the chink obtaining time estimation unit, and to determine whether the state of the terminal is in a playback state or in a halt state by comparing the number of chunks with each threshold.

Effect of the Present Invention

According to an embodiment of the present invention, it becomes possible to obtain playback information without modification for a distribution system by obtaining packet data on a route between a distribution server and a playback terminal in a content distribution system and performing estimation of playback states based on the information.

Accordingly, it becomes possible to estimate playback information which was difficult to obtain from outside of the content distribution system. Also, since modification for the distribution server and the terminal is not necessary, it becomes possible to estimate playback information for various content distribution systems by placing the present system at any position on the distribution route. Especially, in distribution of streaming data, since whether playback halt occurs or not has large effect on playback quality rather than the length of playback halt time, it becomes possible to obtain information contributing to estimation of playback quality by estimation of playback information according to the technique of the present invention. Also, in estimation of the playback halt state, when it is determined that the state is in the halt state, it is possible to determine whether the state is caused by user operation or not.

BRIEF DESCRIPTION OF THE DRAWINGS

FIG. 15A is a diagram for explaining concrete operation of a playback state estimation unit in the embodiment 2;

FIG. 15B is a diagram for explaining concrete operation of a playback state estimation unit in the embodiment 2;

EMBODIMENTS FOR CARRYING OUT THE INVENTION

In the following, embodiments of the present invention is described with reference to figures. The present embodiments are targeted for a video distribution service of a progressive download type. There are a successive type and a chunk type in the video distribution service of the progressive download type. In the following, an embodiment in the successive type is described as an embodiment 1, and an embodiment in the chunk type is described as an embodiment 2. Also, the embodiment 1 includes embodiments 1-1-1-5, and the embodiment 2 includes embodiments 2-1-2-4.

Although the present embodiment is targeted for the video distribution service of the progressive download type, the present invention is not limited to the video distribution service of the progressive download type, and can be applied to various content distribution services.

<Embodiment 1>

In the following, the embodiment 1 of the present invention is described with reference to figures.

In the embodiment 1, in a content distribution system for providing a service for receiving and playing content data distributed via a network, packet capturing and analysis are performed on a distribution route without modifying any program in either of the distribution side and the receiving side.

Figure 1:
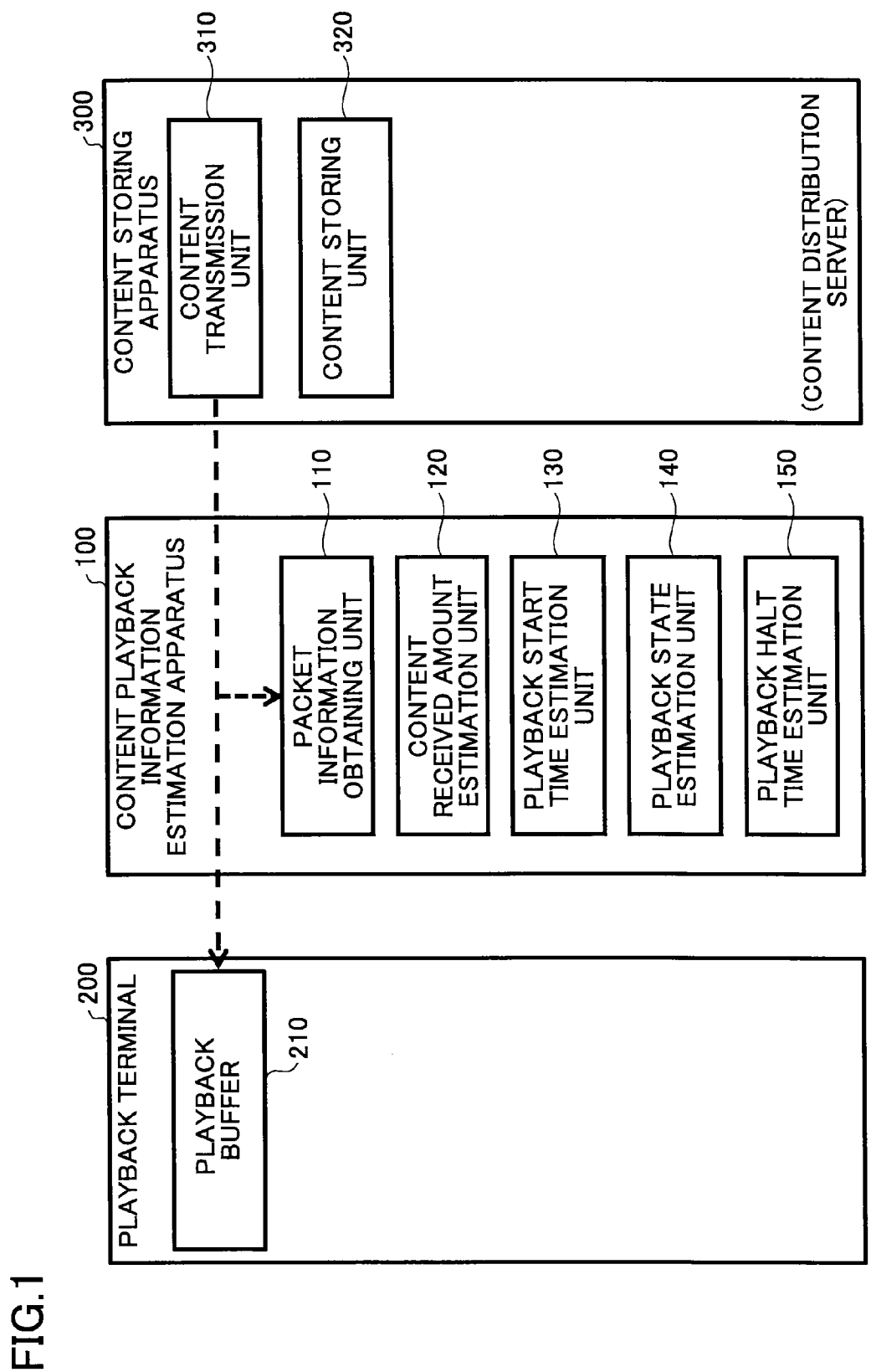
FIG. 1 shows a system block diagram in an embodiment 1.

FIG. 1 shows a system configuration in the embodiment 1.

The system shown in FIG. 1 includes a content playback information estimation apparatus 100 for performing estimation of playback halt states in a terminal for receiving and playing content data, a playback terminal 200, and a content storing apparatus 300.

The content playback information estimation apparatus 100 includes a packet information obtaining unit 110, a content received amount estimation unit 120, a playback start time estimation unit 130, a playback state estimation unit 140, and a playback halt time estimation unit 150.

The playback terminal 200 includes a playback buffer 210 for buffering received content.

The content storing apparatus 300 includes a content transmission unit 310 for transmitting content to a network, and a content storing unit 320 for storing contents to be transmitted.

The packet information obtaining unit 110 obtains capture information (packet information) of packets to be transmitted and received via the network.

The content received amount estimation unit 120 estimates time-series information of a data amount passed to a playback application on the terminal based on the obtained capture information. The content received amount estimation unit 120 can be implemented in a portion which is logically divided on the playback terminal 200. Also, the content received amount estimation unit 120 can be also implemented on any position on a communication route of the carrier network and the like.

The playback start time estimation unit 130 estimates a playback start time based on the time-series information of the data amount estimated by the content received amount estimation unit 120.

The playback state estimation unit 140 estimates a time period required for start of playback and playback/halt state of each time to estimate the playback state based on the data amount, estimated by the playback start time estimation unit 130, consumed at each time by the playback application on the playback terminal 200 after start of playback, and based on time-series information of data amount passed to the playback application estimated by the content received amount estimation unit 120.

The playback halt time estimation unit 150 estimates a time at which the playback is halted and a period during which the playback is halted when the playback state estimation unit 140 determines that the playback is in a halt state.

In the following, concrete processes in the above configuration are described.

[Embodiment 1-1]

In the following, playback halt time estimation processing in the system shown in FIG. 1 is described.

In the present embodiment, the content storing apparatus 300 is described as a content data distribution server (to be referred to as a distribution server hereinafter) including a measure for storing a plurality of pieces of content data and distributing content data of the progressive download type via the network.

The playback terminal 200 includes a measure for playing content received from the distribution server 300 while storing the content in the playback buffer 210.

In the following, a content playback information estimation technique is described for analyzing packets captured on the distribution route and estimating playback halt states in the playback terminal 200, in the system that includes the content playback information estimation apparatus 100, the distribution server 300 and the playback terminal 200.

Figure 2:
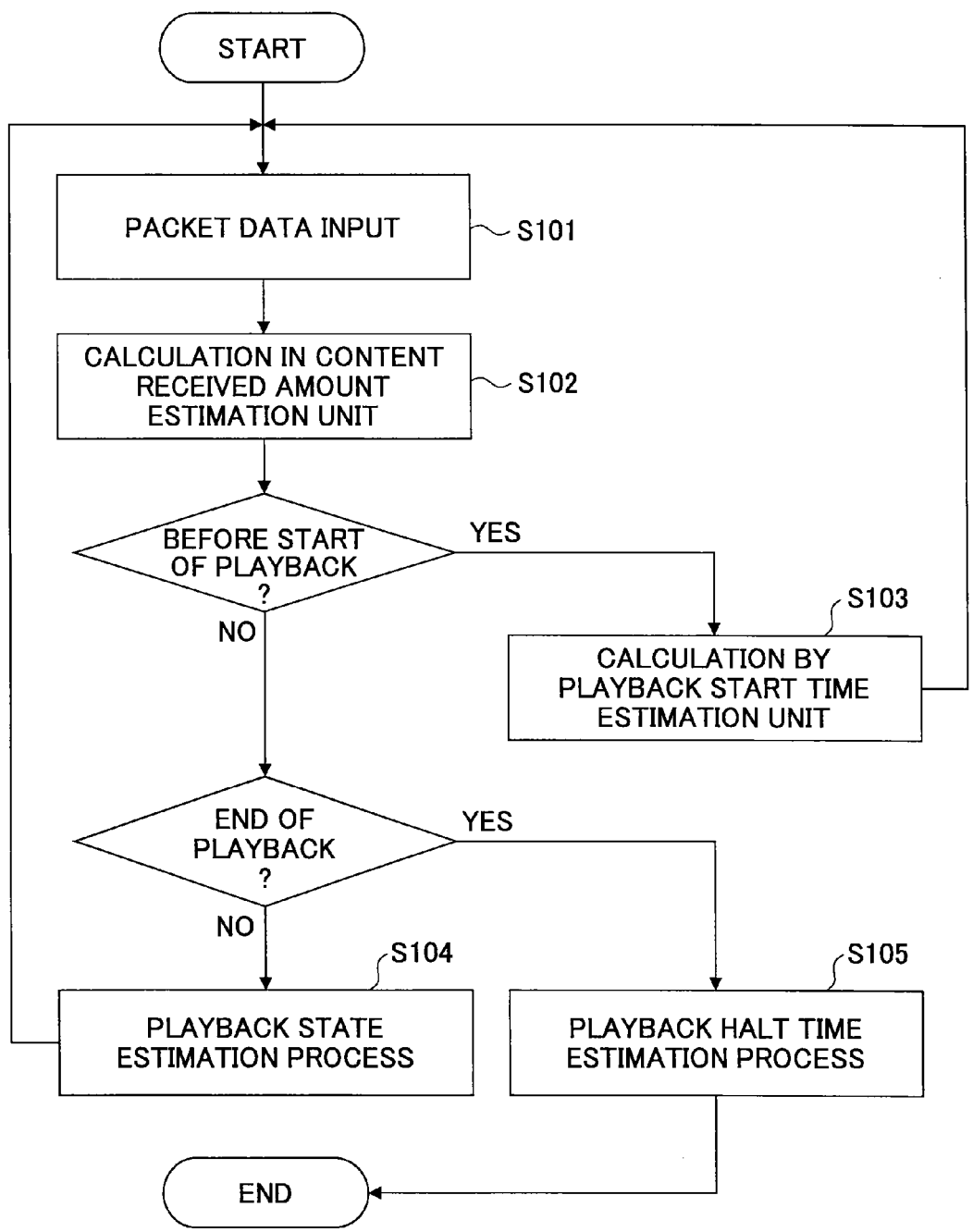
FIG. 2 shows a flowchart in an embodiment 1-1.

FIG. 2 shows a flowchart in the embodiment 1-1.

Step 101) In the content playback information estimation apparatus 100 that is placed between the distribution server 300 of content data and the playback terminal 200, the packet information obtaining unit 110 obtains a part or all of pieces of information in packet information (packet data) exchanged between the distribution server 300 and the playback terminal 200. As the packet information obtaining unit 110, a general sniffer apparatus, program and the like can be used. The packet information obtaining unit 110 may be placed outside of the content playback information estimation apparatus of the present invention, so that captured packet information may be input to the content received amount estimation unit 120.

Step 102) The content received amount estimation unit 120 estimates time-series information of the data amount passed to the playback application in the playback terminal 200 based on a part or all of pieces of the packet information obtained by the packet information obtaining unit 110, and outputs the time-series information to the playback start time estimation unit 130. The time-series information of the data amount can be obtained by estimating received byte amount using a sequence number and time stamp information of RTP (Real-time Transport Protocol), for example, when RTP is used for distribution. Also, even though TCP (Transmission Control Protocol) is used, the received byte amount can be estimated by simulating behavior of the TCP protocol in the playback terminal 200.

It is determined whether playback starts by comparing the data amount estimated by the content received amount estimation unit 120 using packet information received by the packet information obtaining unit 110 with a predetermined playback start threshold. If playback is not yet started, the process goes to step 103.

Figure 3:
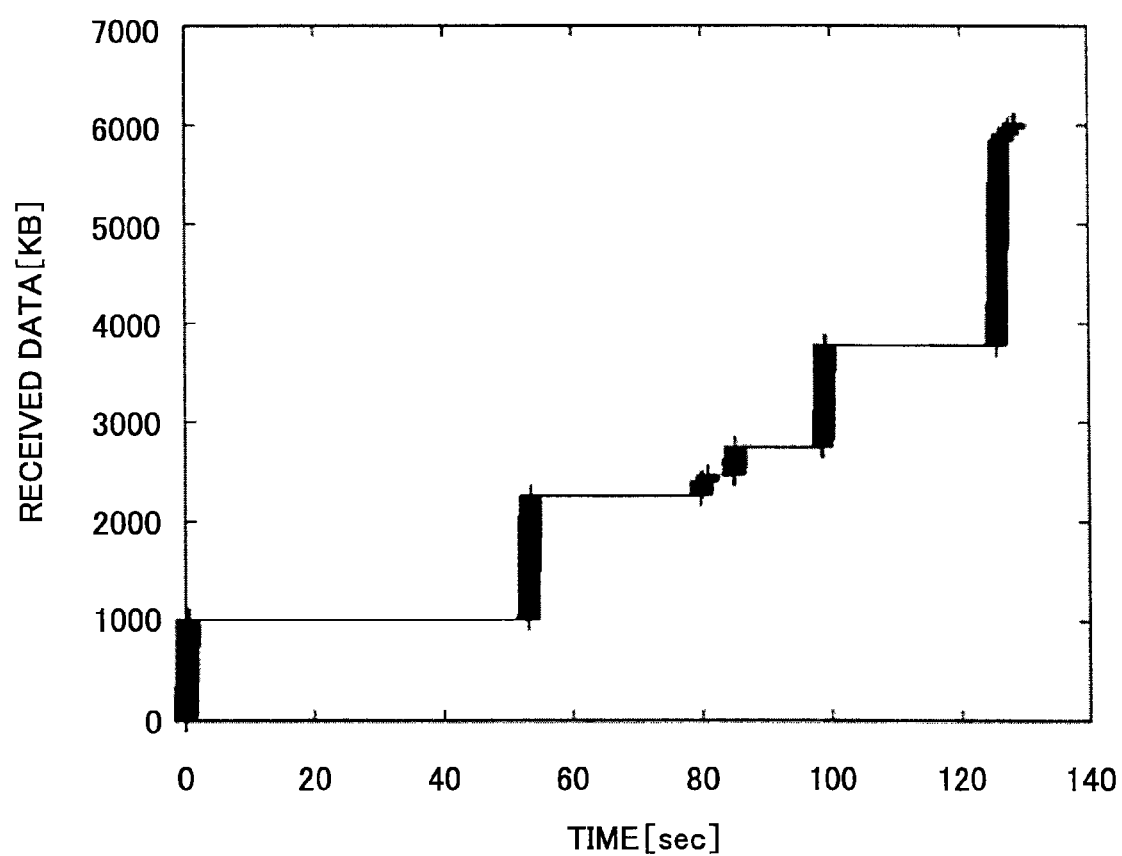
FIG. 3 shows a calculation result example of the content received amount estimation unit in the embodiment 1-1.

FIG. 3 shows an example of an estimation result of the received amount in the content received amount estimation unit 120.

Step 103) The playback start time estimation unit 130 estimates a time period required for start of playback based on time-series information of the data amount estimated in the content received amount estimation unit 120. For example, the time period required for start of playback is a time required for receiving data to a threshold of the buffer amount at which the content is played initially. After this processing, the process returns to step 101.

Step 104) It is determined whether playback starts by comparing the data amount estimated by the content received amount estimation unit 120 using packet information received by the packet information obtaining unit 110 with a predetermined playback start threshold. Then, in a case where playback has been started, and the size of content data is described in packet data so that it is determined that playback has not yet ended, or it is determined the flow is not disconnected, the playback state estimation unit 140 determines whether playback is continuing at arbitrary time after start of communication of the playback terminal 200 based on data amount consumed by the playback application on the playback terminal 200 at each time after playback starts. For example, determination is performed by the following procedure.

As a buffer parameter in the playback application, it is assumed that $Th_p$ is used as a threshold of the buffer amount at which playback of content starts, and $Th_s$ is used as a threshold of a buffer amount at which playback of content halts. At this time, the buffer amount is increased/decreased by supplying the time-series data of the received amount obtained by the content received amount estimation unit 120 and a data amount consumed in each time after the playback time of the playback application. That is, when playback is continuing, if the received amount increases by $\Delta B$ at a time, the buffer amount is increased by $\Delta B$, and if the data amount consumed by the playback application increases by $\Delta C$, the buffer amount is decreased by $\Delta C$. As a result of the calculation, if the remaining amount of the buffer amount becomes lower than $Th_s$, "playback state" is changed to "halt state".

The playback state estimation unit 140 may obtain necessary data amount at each playback time, as data amount consumed in each time after start of playback of the playback application, by performing decoding in a pseudo manner based on packet information exchanged between the distribution server 300 and the playback terminal 200, or may obtain the data amount by assuming that the playback application consumes data at a fixed predetermined bit rate. The method for obtaining the data amount is not limited to these methods. For example, when the bit rate is assumed to be fixed 800 kbps, it can be considered that a data amount of 100 KB is consumed one second after the start of playback in total, and a data amount of 200 KB is consumed two seconds after the start of playback in total. Accordingly, the data amount consumed by the playback application on the playback terminal 200 at each time after the start of playback is provided in a time-series manner.

Figure 4:
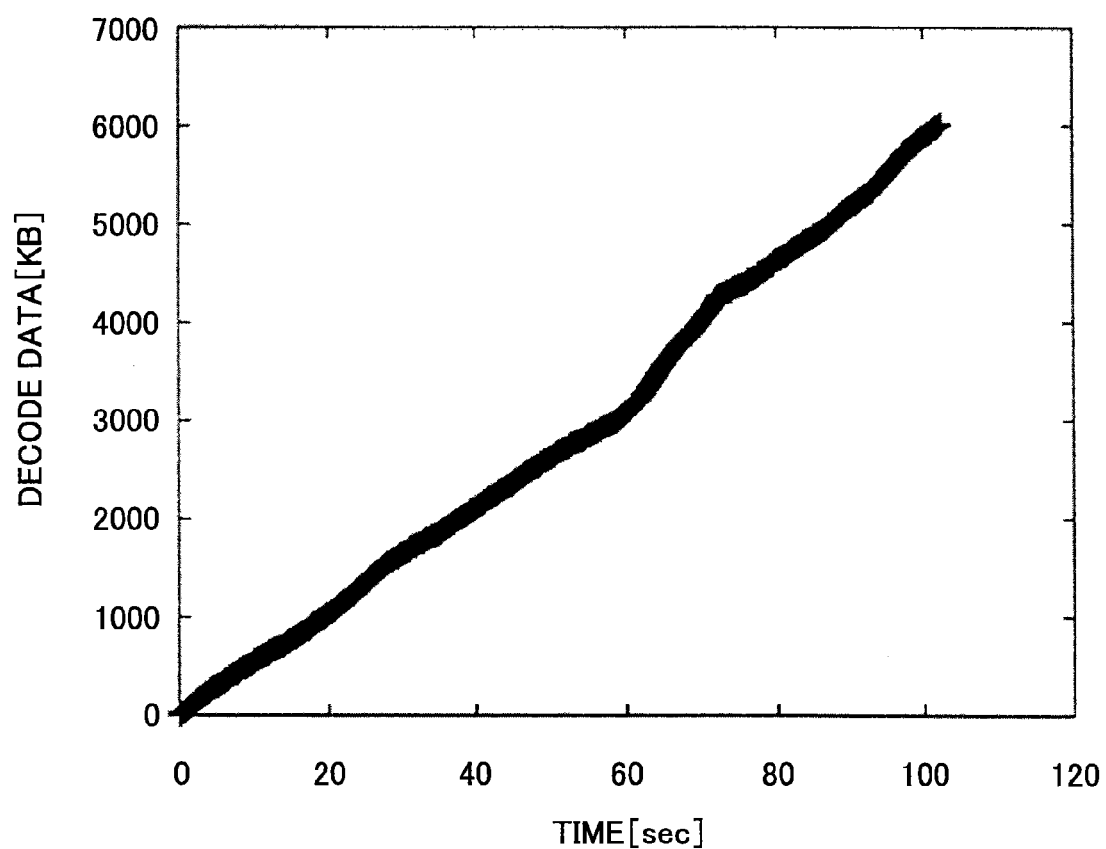
FIG. 4 shows a data amount consumed by a playback application at each time after start of playback in the embodiment 1-1.

FIG. 4 shows an example of the data amount consumed by the playback application at each time after start of playback.

Step 105) It is determined whether playback starts by comparing the data amount estimated by the content received amount estimation unit 120 using packet information received by the packet information obtaining unit 110 with a predetermined playback start threshold. If it is determined that playback has been started, and the size of content data is described in packet data so that it is determined that playback has ended, or, if it is determined that the flow is disconnected, the estimation result by the playback state estimation unit 140 becomes "halt state". Then, the playback halt time estimation unit 150 estimates information on playback state such as a time point or a time period at which playback halts.

Although increase/decrease of the buffer amount is performed similarly even in the halt state, since playback of content in the playback terminal 200 is halted, the data amount consumed by the application becomes 0, and only increment of received amount is added. If the remaining amount of the buffer amount exceeds $Th_p$, it is determined that playback of content starts.

The playback halt time estimation unit 150 estimates the time and the length by which the playback is halted. The playback state estimation unit 140 stores each time point at which the playback state changes in an inside memory (not shown in the figure) as playback state change information, and the playback halt time estimation unit 150 obtains the information.

Figure 5:
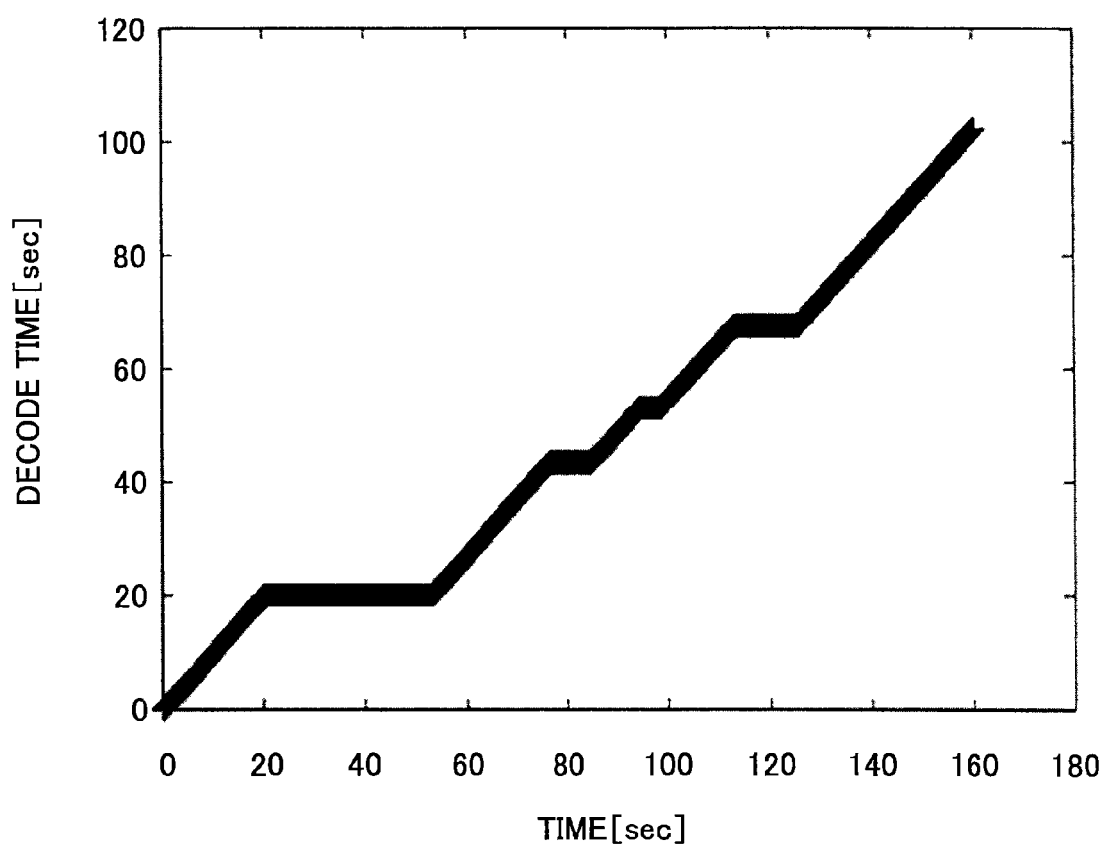
FIG. 5 shows an example of an estimation result for information on playback state in the embodiment 1-1.

FIG. 5 shows an example of an estimation result that is output. It is also possible to output a total halt time and a total halt number of times by processing the estimation result.

[Embodiment 1-2]

Figure 6:
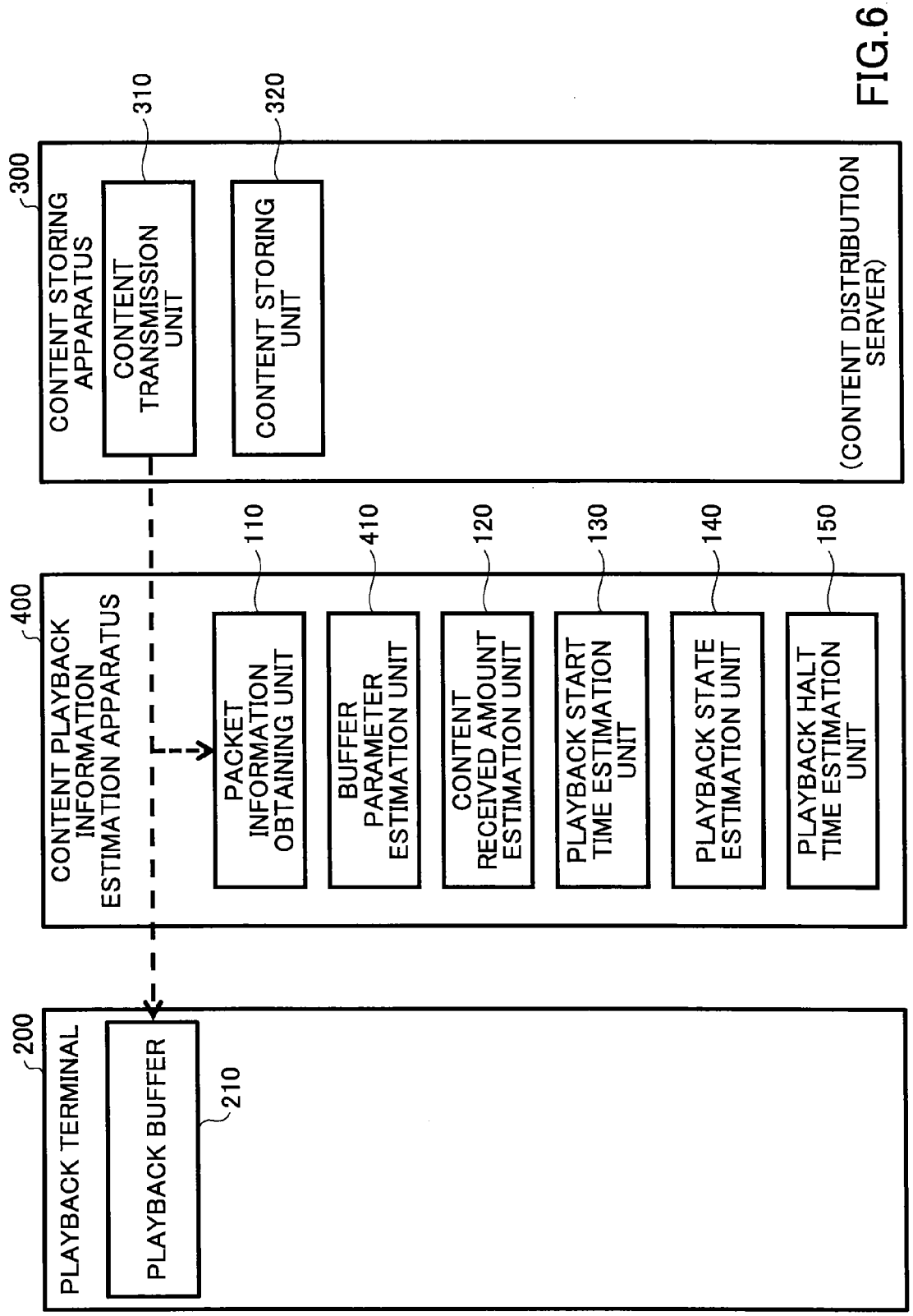
FIG. 6 shows a system block diagram in an embodiment 1-2.

FIG. 6 shows a system configuration in the embodiment 1-2. In the figure, configuration parts the same as those in FIG. 1 are assigned the same reference, and the description is not given.

The content playback information estimation apparatus 400 shown in FIG. 6 is configured by adding a buffer parameter estimation unit 410 to the configuration of the content playback information estimation apparatus 100 of FIG. 1.

Figure 7:
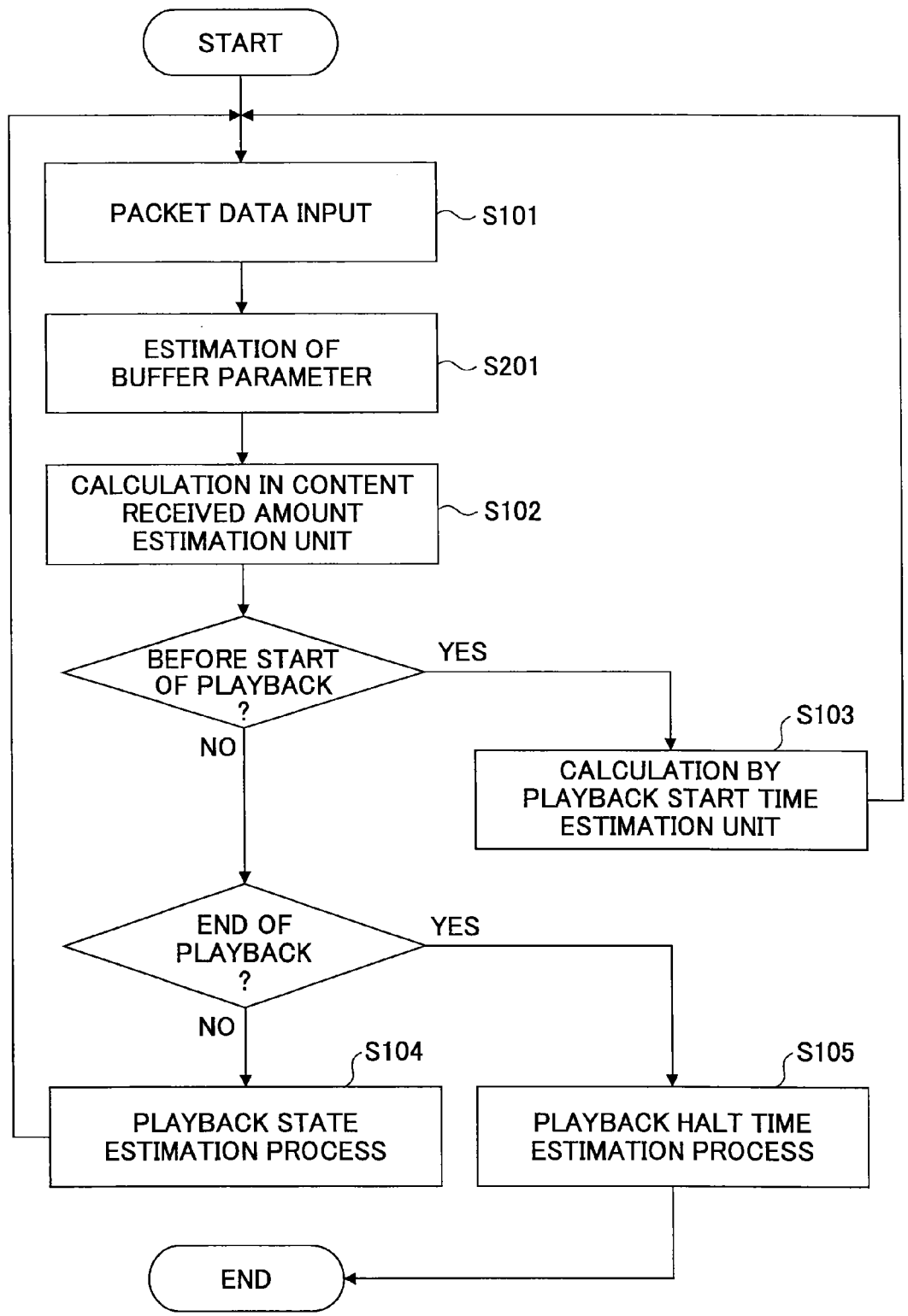
FIG. 7 shows a flowchart of processes in the embodiment 1-2.

FIG. 7 is a flowchart of processes in the second embodiment of the present invention, in which processes the same as those on the flow of the first embodiment shown in FIG. 2 are assigned the same step numbers.

Step 101) The packet information obtaining unit 110 of the content playback information estimation apparatus 400 obtains a part or all of pieces of information exchanged between the distribution server 300 and the playback terminal 200.

Step 201) The buffer parameter estimation unit 410 estimates a buffer parameter based on packet information that is sent and received via the network obtained by the packet information obtaining unit 110. The buffer parameter is a threshold of a buffer amount for starting playback of content, a threshold of a buffer amount for halting playback of content, and a coding rate of video, and the like. The estimation is performed by pattern matching of data in a predetermined packet. For example, as a threshold of a buffer amount for starting playback of content, when a HTTP GET message is sent and received with a parameter of "bc", the buffer parameter is determined as a number sequence following "bc=".

Step 102) Next, the content received amount estimation unit 120 estimates time-series information of data amount passed to the playback application in the playback terminal 200 based on a part or all of pieces of the packet information obtained by the packet information obtaining unit 110, and outputs the time-series information to the playback start time estimation unit 130.

Step 103) The playback start time estimation unit 130 estimates a time period required for start of playback based on time-series information of the data amount estimated in the content received amount estimation unit 120. For example, the time period required for start of playback is a time required for receiving data to a buffer parameter estimated by the buffer parameter estimation unit 130 (a threshold of the buffer amount at which the content is played initially).

Step 104) Also, the playback state estimation unit 140 determines whether playback is continuing at any time after start of communication based on the data amount consumed at ach time after the playback application on the playback terminal 200 starts playback. For example, the determination is performed by the following procedure.

It is assumed that, as buffer parameters obtained by the buffer parameter estimation unit 410, $th_p$ is the threshold of a buffer amount for starting playback of content, and $th_s$ is the threshold of the buffer amount for halting playback of content. At this time, increase/decrease of the buffer amount is performed by inputting time-series data of the received amount and a data amount to be consumed at each time after playback time of the playback application which are obtained by the content received amount estimation unit 120. That is, in a case where the content is being played, when the received amount increases by $\Delta B$ at a time, the buffer amount is increased by $\Delta B$, and when the data amount consumed by the playback application is increased by $\Delta C$, the buffer amount is decreased by $\Delta C$. As a result of the calculation, if the remaining amount of the buffer amount falls below $th_s$, the state is changed from "playback state" to "halt state".

The data amount consumed at each time after the playback application starts playback can be obtained in the same way as the before-mentioned embodiment 1-1.

Step 105) If the playback state estimated by the playback state estimation unit 140 is "halt state", the playback halt time estimation unit 150 estimates information on playback state such as the time point and time period at which playback halts. Although, increase/decrease of the buffer amount is performed similarly even in the halt state, since playback of content is halted, the data amount consumed by the application becomes 0, and only increment of received amount is added. If the remaining amount of the buffer amount exceeds $Th_p$, it is determined that playback of content starts.

The playback halt time estimation unit 150 estimates the time point and the time at which the playback halts based on the playback state estimation unit 140.

[Embodiment 1-3]

Figure 8:
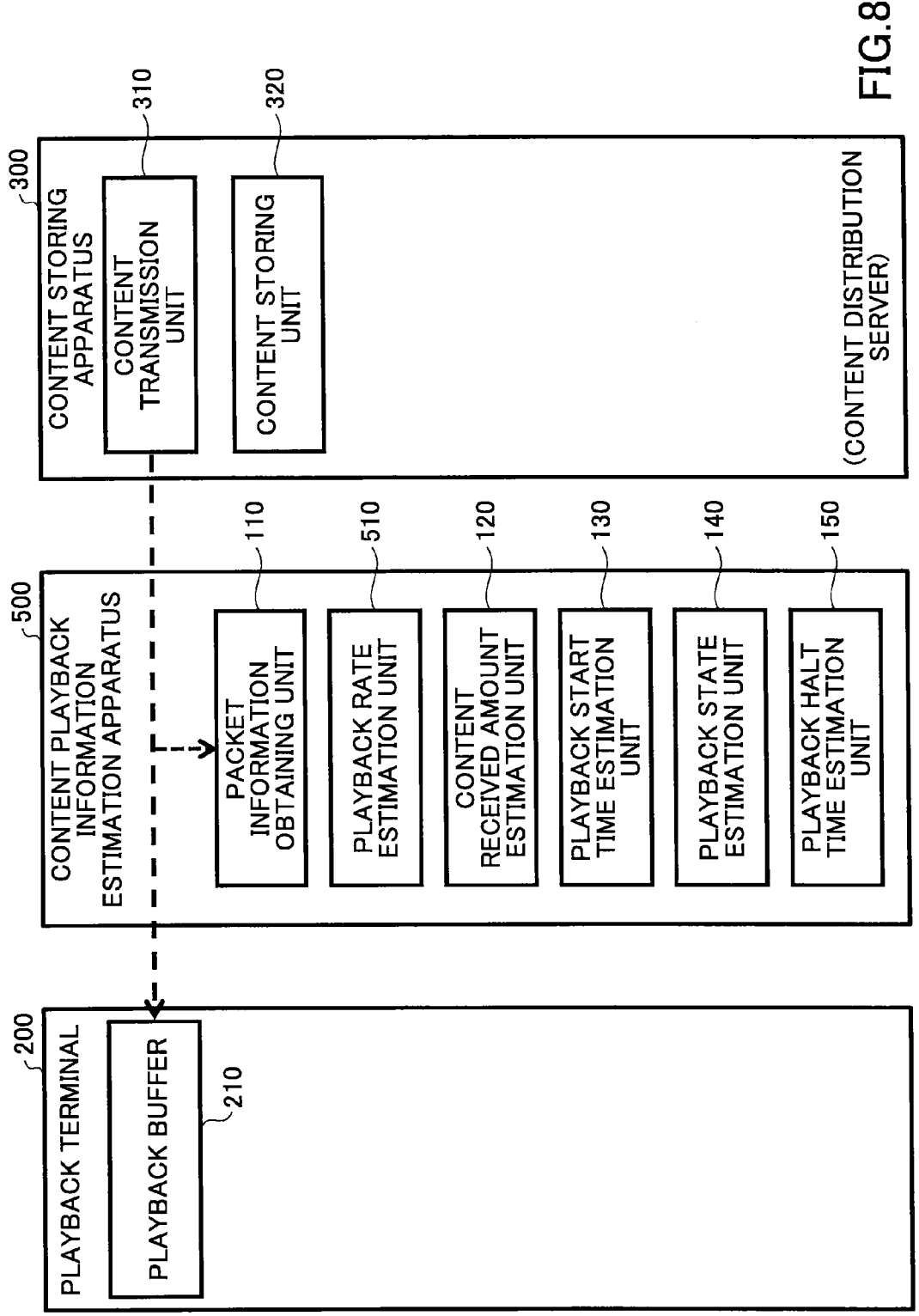
FIG. 8 shows a system block diagram in an embodiment 1-3.

FIG. 8 shows a system configuration in the embodiment 1-3. In the figure, configuration parts the same as those in FIGS. 1 and 6 are assigned the same reference, and the description is not given.

Figure 9:
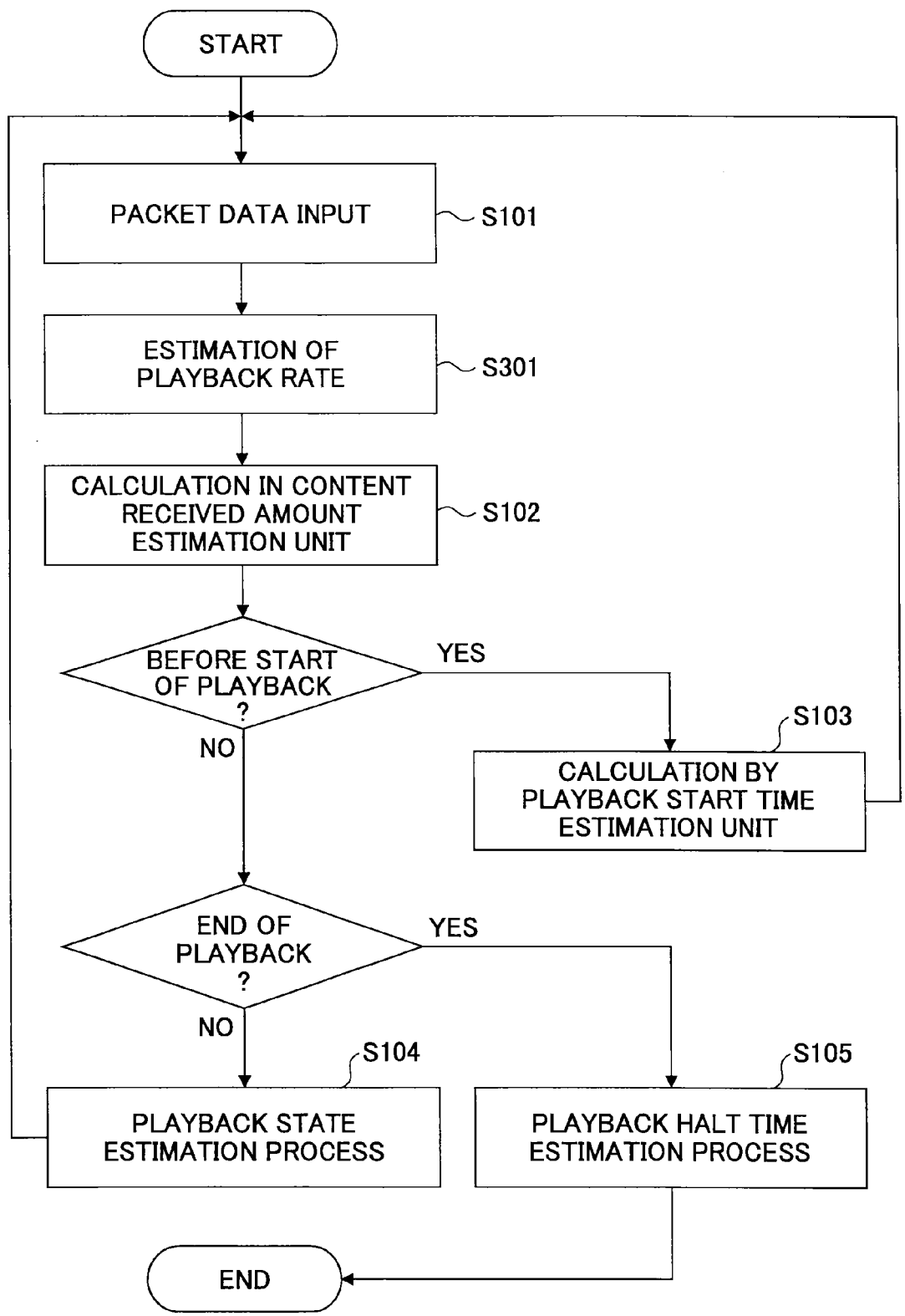
FIG. 9 shows a flowchart of processes in the embodiment 1-3.

Also, FIG. 9 is a flowchart of processes in the embodiment 1-3, and description of processes similar to those shown in FIGS. 2 and 7 is not given.

In the present embodiment, a playback rate estimation unit 510 is provided for estimating a data amount read from the playback buffer 210 at each playback time of content data received by the playback terminal 200 based on packet information sent and received via the network in the first and the second embodiments, and the estimation result of the playback rate estimation unit 510 is supplied to the playback start time estimation unit 130.

The playback rate estimation unit 510, for example, reconstructs information that is sent and received between the distribution server 300 and the playback terminal 200 from packet information obtained by the packet information obtaining unit 110, extracts content played by the playback terminal 200, estimates decode amount at each playback time based on coded video/voice data, and supplies the decode amount to the playback start time estimation unit 130 as a data amount consumed at each time after start of playback (step 301). By estimating playback information of content based on information of packets, it is possible to estimate the data amount consumed by the application of the terminal at each time more accurately.

Processes other than the playback rate estimation unit 510 are the same as those in the before mentioned embodiments, and the description is not given.

[Embodiment 1-4]

Figure 10:
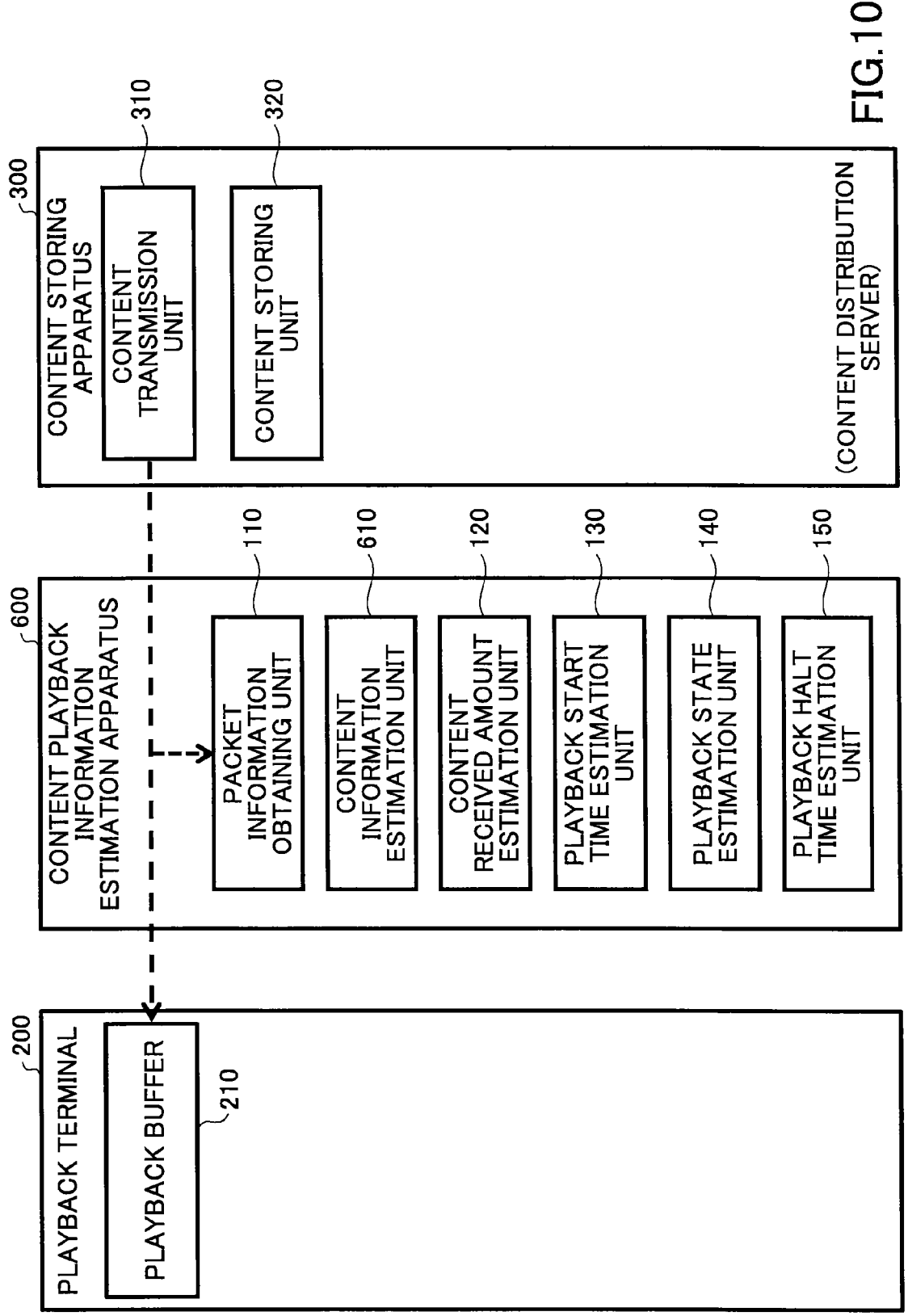
FIG. 10 shows a system block diagram in an embodiment 1-4.

FIG. 10 shows a system configuration in the embodiment 1-4. In the figure, configuration parts the same as those in FIGS. 1, 6 and 8 of the embodiments 1-1-1-3 are assigned the same reference.

Figure 11:
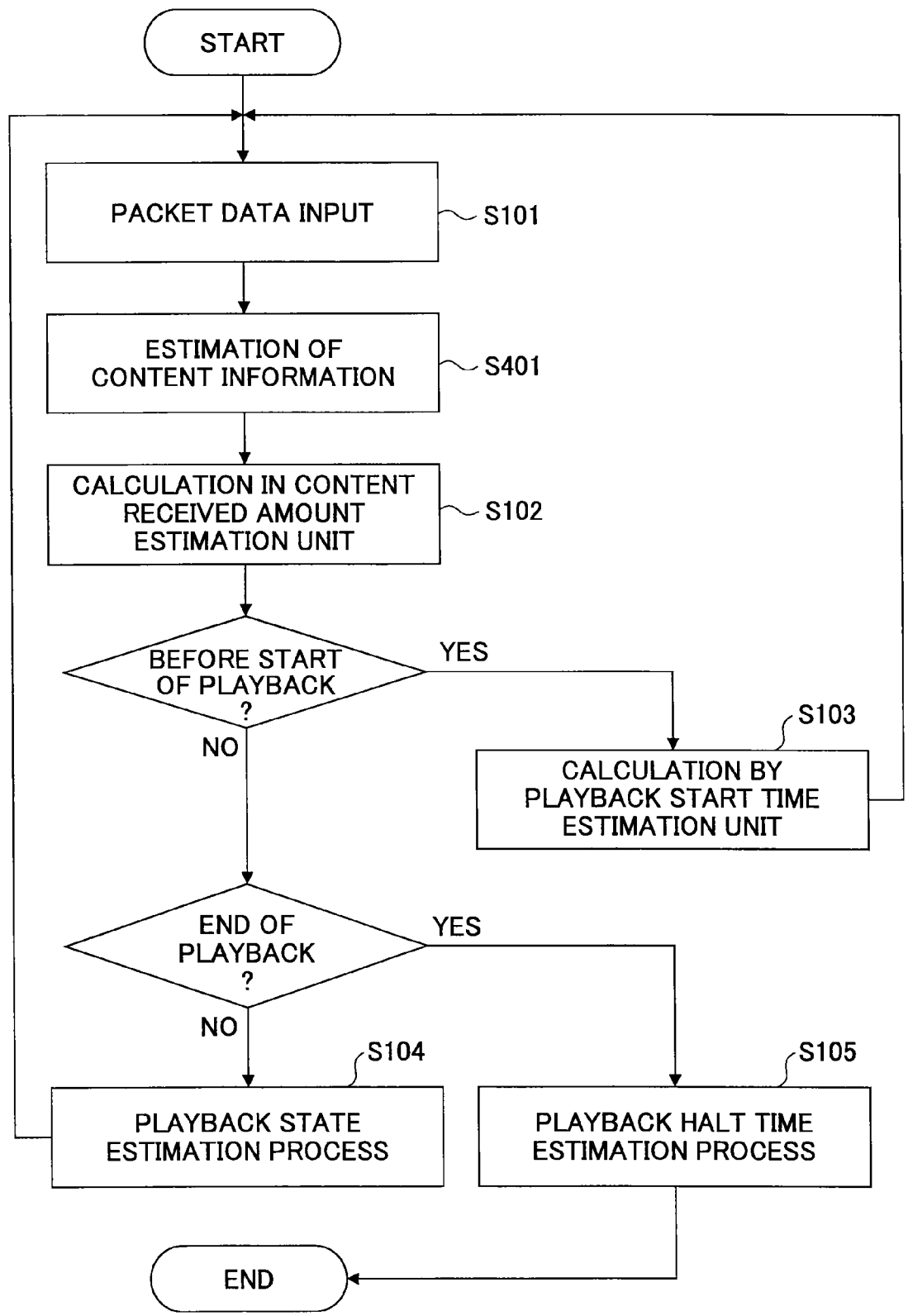
FIG. 11 shows a flowchart of processes in the embodiment 1-4.

FIG. 11 is a flowchart of processing in the embodiment 1-4.

The content playback information estimation apparatus 600 of the present embodiment includes a content information estimation unit 610 for estimating a total amount of content data received by the playback terminal 200 and a playback time length of the content based on the packet information sent and received via the network in the embodiments 1-1 and 1-2, and supplies the estimation result of the content information estimation unit 610 to the playback state estimation unit 140.

The content information estimation unit 610 estimates a total amount of content data received by the playback terminal 200 based on information such as a Content-Length header included in sent and received HTTP GET messages obtained by the packet information obtaining unit 110, and differences of sequence numbers at the time of occurrence and end of TCP flows. Also, the estimation of playback time length of content is performed by pattern matching of data in predetermined packets. For example, when the HTTP GET message is sent and received with a parameter of "len", a number sequence following "len=" is estimated as the buffer parameter (step 401).

When it is assumed that the total amount of estimated content data is B, and that the time length of the content is len, an average bit rate of the content is considered as B/len. Thus, the data amount consumed at each time after start of playback of the application on the playback terminal 300 is linearly calculated from the average bit rate, and is supplied to the playback state estimation unit 140.

Processes other than the playback rate estimation unit 510 are the same as those in the before mentioned embodiments, and the description is not given.

[Embodiment 1-5]

The system configuration in this embodiment is similar to the configuration of the embodiment 1-4. But, in the present embodiment, the content information estimation unit 610 estimates a data amount read from the playback buffer in each playback time based on a predetermined playback rate fixed value for each content and content data received by the playback terminal 200, and the estimation result is supplied to the playback state estimation unit 140. At this time, the content data received by the playback terminal 200 is supplied to the content information estimation unit 610 via the packet information obtaining unit 110.

In the content information estimation unit 610 in the present embodiment, playback rates are prepared as discrete values based on image quality information of content such as "high image quality", "low image quality" and the like that are predetermined in the distribution system, for example. Also, content image quality information is estimated from exchanged information based on packet information, so that corresponding playback rate is determined as an average bit rate of the content data. By using the average bit rate, the data amount consumed at each time after start of playback by the application on the terminal is linearly calculated, and the data amount is supplied to the playback state estimation unit.

Other processes are the same as those in the before mentioned embodiment 1-4, and the description is not given.

The operation of configuration elements of each content playback estimation apparatus of FIGS. 1, 6, 8 and 10 in the embodiment 1 can be constructed a program, and the program can be installed and executed in a computer used as the content playback information estimation apparatus, or the program can be circulated via a network.

That is, each content playback information estimation apparatus in the embodiment 1 can be realized by causing a computer to execute a program which describes the process content described in the present embodiment 1. More specifically, the function of each unit of the content playback information estimation apparatus can be realized by executing a program corresponding to processes performed by each unit by using hardware resources such as a CPU, memory and hard disk and the like in the computer which is used as the content playback information estimation apparatus. The program can be saved and distributed by recording the program in a computer readable recording medium (such as portable memory). Also, the program can be provided via a network such as the Internet, an electronic mail and the like.

<Embodiment 2>

Next, an embodiment 2 of the present invention is described with reference to figures.

According to the embodiment 2, in a system for providing a service for receiving and playing content data distributed via a network, playback halt states in a terminal for receiving and playing content data in the system are estimated by performing packet capturing and analysis on the distribution route without modifying the system.

Figure 12:
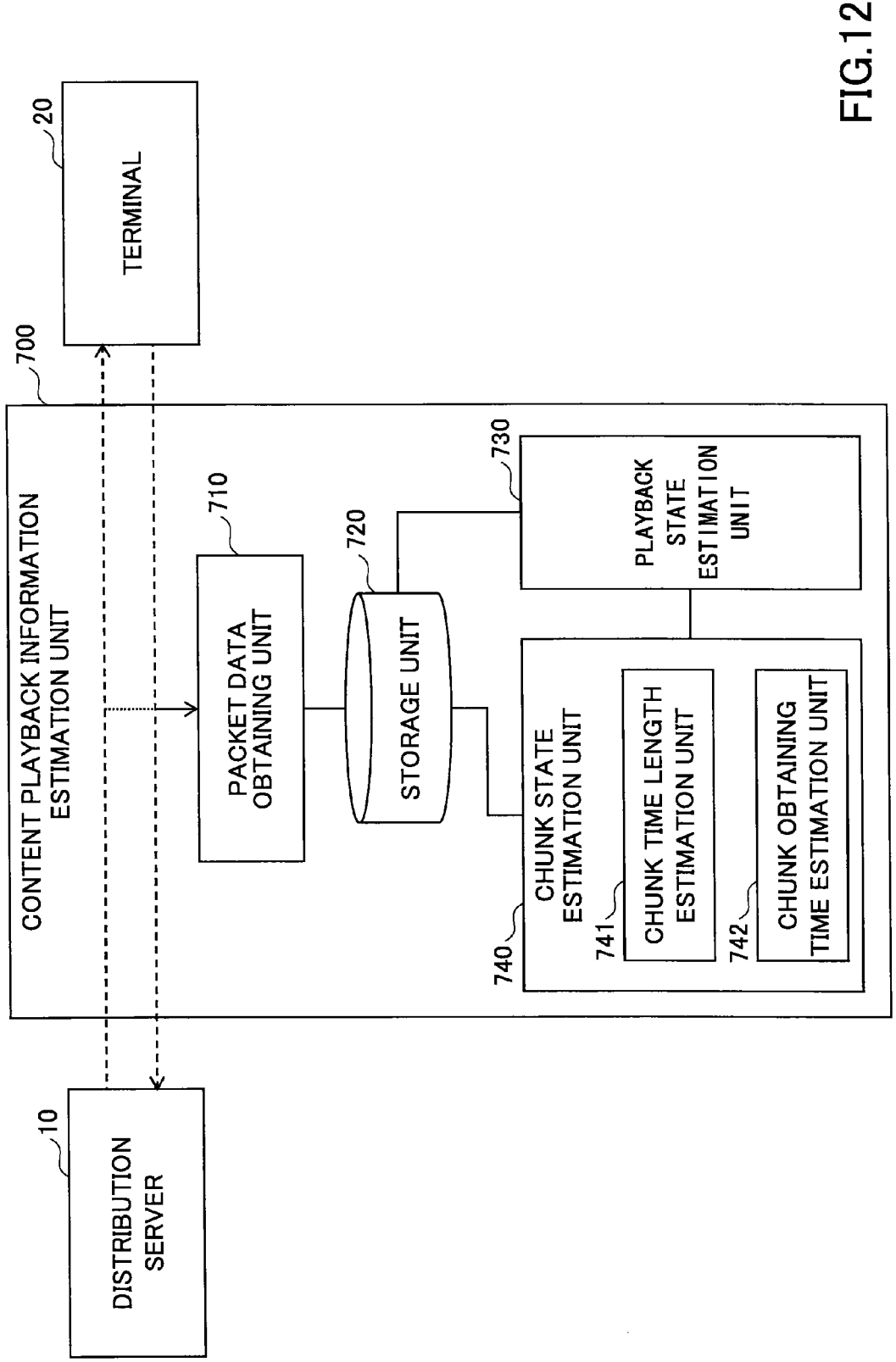
FIG. 12 shows a block diagram of a content playback information estimation apparatus in an embodiment 2.

FIG. 12 shows a configuration of the content playback information estimation apparatus in the embodiment 2.

The content playback information estimation apparatus 700 shown in the figure is connected to a distribution server 10 for performing distribution in units of chunks and a terminal 20, and includes a packet data obtaining unit 710, a storage unit 720, a playback state estimation unit 730, and a chunk state estimation unit 740. The terminal 20 includes at least a playback buffer and a playback application.

In the present embodiment, the distribution server 10 distributes a piece of content to the terminal 20 by dividing the content into a plurality of chunks. The terminal 20 includes a playback buffer, and when a predetermined number of chunks are stored in the playback buffer, playback starts. While the content is being played, data necessary for playback is read from the playback buffer, and when the number of chunks stored in the playback buffer falls below a playback halt threshold, playback halts, and when the number of chunks exceeds a playback start threshold, playback starts.

The packet data obtaining unit 710 obtains information of packets that are distributed in units of chunks from the distribution server 10 to the terminal 20, and stores the information in the storage unit 720. Pieces of information that are obtained are packet information (packet data), packet capture information for each chunk, content list and the like. The packet capture information in units of chunks are obtained by dividing capture data in units of packets into each chunk.

The chunk state estimation unit 740 includes a chunk time length estimation unit 741 and a chunk obtaining time estimation unit 742.

The chunk time length estimation unit 741 generates a list of playback time lengths of each chunk by reading chunk information or known content rules and the like from the storage unit 720. The list of the playback time lengths can be stored as an a one dimensional array, for example, and may be stored as a two dimensional array by associating the playback time lengths with chunk numbers.

The chunk obtaining time estimation unit 742 reads packet capture information from the storage unit 720, estimates a time point at which sending and receiving of each chunk completes to generate a list of obtaining times of each chunk. The list of the obtaining times can be stored as a one dimensional array, for example, and may be stored as a two dimensional array by associating the obtaining times with chunk numbers.

The playback state estimation unit 730 estimates the remaining number of chunks in the playback buffer at each time based on the list of playback time lengths of each chunk generated by the chunk time length estimation unit 741 and the list of obtaining times of each chunk generated by the chunk obtaining time estimation unit 742, so as to estimate whether the content is currently in a playback state, or in a halt state, and estimate playback information such as time required for start of playback.

For example, a system is assumed in which, in the terminal 20, playback starts when reception of at least one chunk completes, and, when the number of chunks becomes 0, playback halts. At this time, right after content playback start request, if it is assumed that the packet data obtaining unit 710 has received data of 3 chunks and that the data of 3 chunks has a content time length of 30 seconds, playback starts right after start of playback, and a playback state continues for 30 seconds. Also, while data of the next chunk does not arrive, a playback halt state continues, and at the time when reception of the next chunk data completes, playback restarts. After that, in the same way, playback states are estimated based the remaining number of data of chunks that have been received.

[Embodiment 2-1]

In the following, description is given based on FIG. 12 described before as the content playback information estimation apparatus.

The content playback information estimation apparatus 700 that is placed between the content data distribution server 10 and the terminal 20, in the packet data obtaining unit 710, obtains all or a part of pieces of information of packet data exchanged between the distribution server 10 and the terminal 20 in units of chunks, and stores the information in the storage unit 720. The packet data obtaining unit 710 can be replaced with a general packet monitoring apparatus, program and the like. Also, the captured packet data may not be stored in the storage unit 720 and may be supplied directly to the chunk time length estimation unit 741 or to the chunk obtaining time estimation unit 742. In the present embodiment, a case is described in which packet data is stored in the storage unit 720, and the chunk state estimation unit 740 reads packet data. Also, the chunk time length estimation unit 741 and the chunk obtaining time estimation unit 742 include a memory (not shown in the figure), which stores a chunk time length list which is a list of chunk playback time lengths and a chunk obtaining time list.

Figure 13:
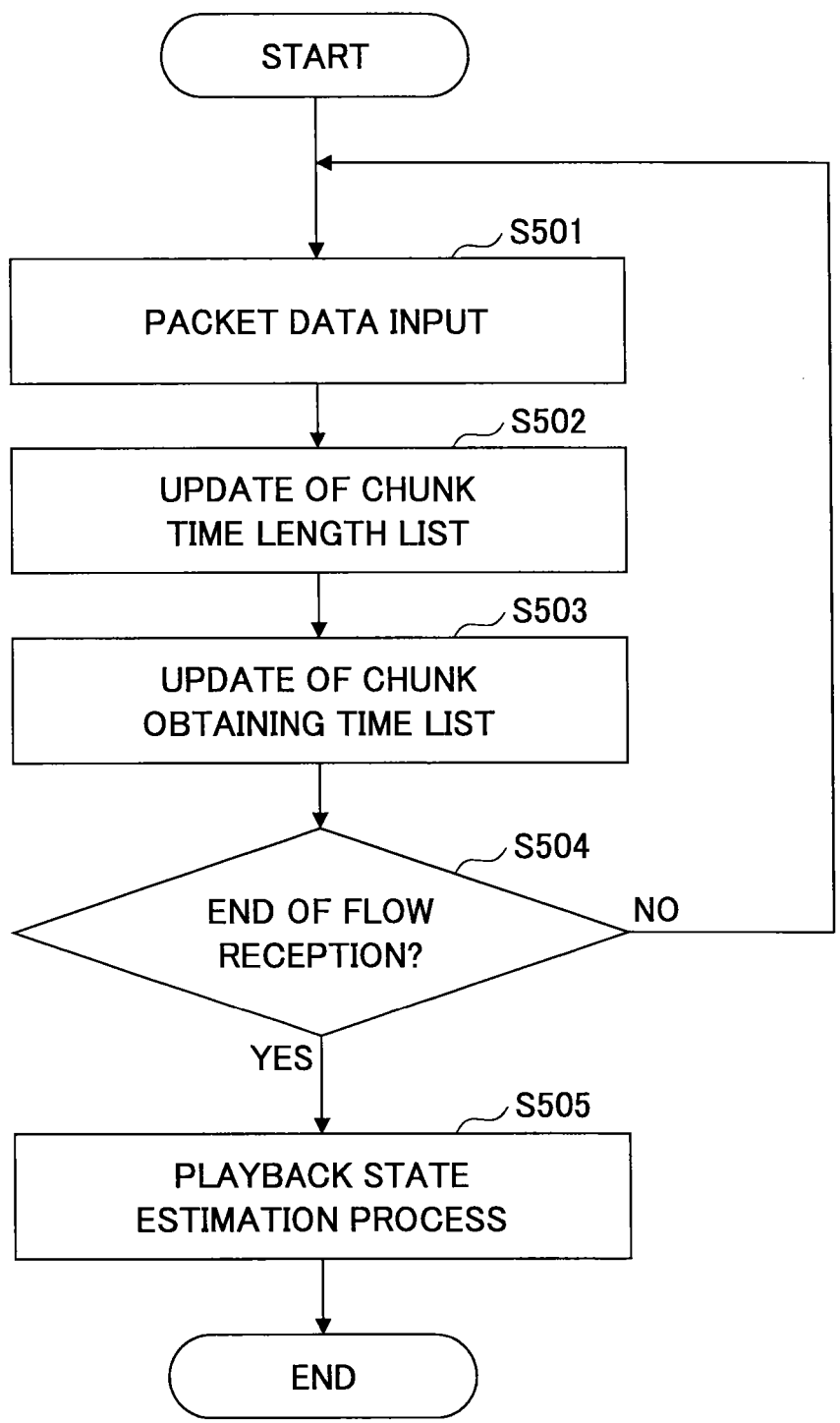
FIG. 13 is a flowchart showing an outline of operation in an embodiment 2-1.

FIG. 13 is a flowchart showing an outline of operation in the embodiment 2-1.

In the present embodiment, as shown in the figure, each time when packet data is supplied, the packet data obtaining unit 710 stores the packet data in the storage unit 720 (step 501), and the chunk playback time length estimation unit 741 reads the packet data from the storage unit 720 to estimate a chunk playback time length and update the chunk time length list (step 502). Also, the chunk obtaining time estimation unit 742 reads packet data from the storage unit 720 to estimate a chunk obtaining time and updates the chunk obtaining time list (step 503). At the time when the flow reception ends (Yes in step 504), the playback state estimation unit 730 performs processing (step 505).

The chunk time length estimation unit 741 estimates a playback time length of each chunk passed to the playback application on the terminal based on a part or all of pieces of packet data (chunk numbers and time lengths) stored in the storage unit 720, and stores the playback time lengths in the memory (not shown in the figure) as the chunk time length list. A content list (file list) may be exchanged with the distribution server 10 with a predetermined format and the like, so that the playback time length of each chunk may be extracted from description of time length in the content list. Also, the playback time length of each chunk is not constant, and may be a time length corresponding to a chunk playback time length that is obtained beforehand from content identifier and the like. Also, by decoding encoded chunk data, the time length may be estimated from time stamp of corresponding codec and the like. For example, as the content list (file list), a content list of a format complying with HLS(HTTP Live Streaming) (refer to R. Pantos, Ed., W. May, "HTTP Live Streaming," IETF Internet-Draft, September 2011.) can be used, wherein URI (Unified Resource Indicator) and a time length of each chunk file are described in the content list.

Based on a part or all of pieces of packet data stored in the storage unit 720, the chunk obtaining time estimation unit 742 estimates obtaining time of each chunk passed to the playback application on the terminal 20 based on the chunk obtaining complete time obtained from the packet data, and stores the obtaining time in a memory (not shown in the figure) as the chunk obtaining time list. The obtaining time indicates a time at completion of obtaining each chunk. But, in a case where it is difficult to obtain obtaining completion time, obtaining start time can be used as a substitute of the obtaining completion time. When the obtaining start time is used, there is a small time lag. But, if it is assumed that the state of the network is constant to a certain extent, since the time lag becomes a relative difference of a certain time, the time lag is permissible. In a process where determination is performed using both of the obtaining completion time and start time, it is not possible to use the start time as a substitute of the completion time.

The playback state estimation unit 730 estimates playback states of content based on the playback time length of each chunk which is estimated and generated by the chunk time length estimation unit 741 and the obtaining time of each chunk estimated and generated by the chunk obtaining time estimation unit 742.

For example, estimation is performed in the following procedure.

First, following parameters are preset as buffer parameters in the playback application:

Threshold $th\_p$ of the number of chunks in the buffer when playback of content starts;

Threshold $th\_s$ of the number of chunks when playback halts;

Threshold $th\_r$ of the number of chunks when playback restarts.

At this time, the chunk state estimation unit 740 estimates the number of chunks stored in the buffer of the terminal at any time based on the playback time length (list of chunk playback time length) of each chunk and obtaining time of each chunk (list of obtaining time of each chunk). The time at which $th\_p$-th chunk is obtained is set to $T\_0$ as an estimated playback start time. The time at which the number of chunks exceeds the threshold $th\_p$ of the number of chunks of start of playback is regarded as a playback start time estimated value.

Next, a variable i indicating a chunk number which is being played is set to 1, and the number of chunks currently stored in the buffer is set as n which is set to $th\_p$. Also, $T\_0$ is set to a target time T at which estimation of playback state is performed. Here, a chunk number i of the first chunk of content is set as 1, and after that, a value of increment of 1 (i=i+1) is set to the chunk number i in an order of playback of chunk, a playback time length of each i-th chunk in the chunk playback time length list is set as $len\_i$, and $t\_i$ is set as a relative value of an obtaining time of each chunk in the chunk obtaining time list in which the time of start of obtaining the first chunk data in the content is set to 0. In the following, every time is considered as a relative value from the playback start unless otherwise specified.

It is checked in the following procedure whether halt of playback occurs after playing i-th chunk.

Figure 14:
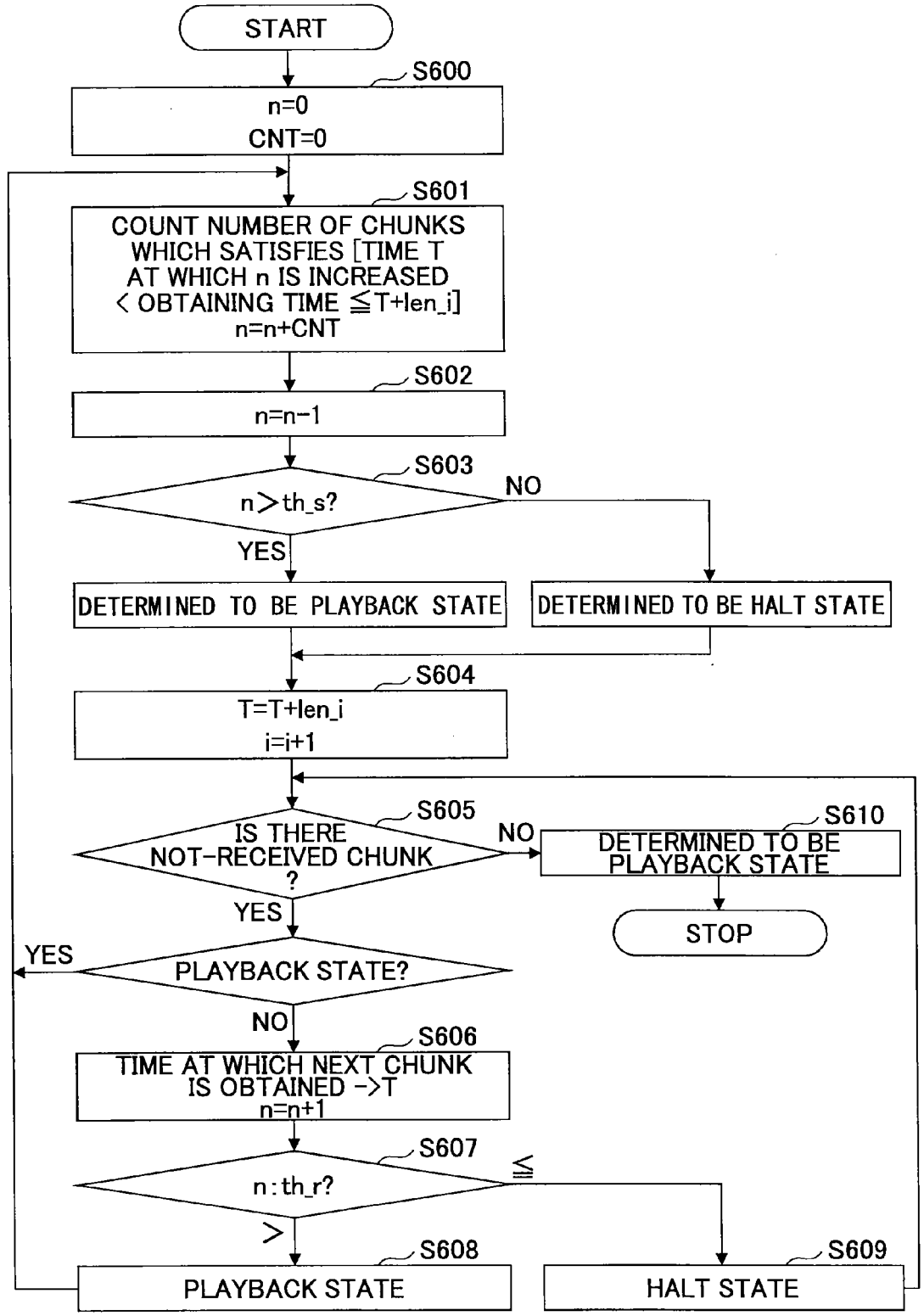
FIG. 14 is a flowchart of a halt estimation procedure in the embodiment 2-1.

FIG. 14 is a flowchart of a halt estimation procedure in the embodiment 2-1.

Step 600) A counter is set as n=0, and CNT is set as CNT=0.

Step 601) The number (CNT) of chunks is counted in which, in the list recording obtaining time of each chunk, obtaining time is greater than a time T and equal to or less than $T+len\_i$ ($T<t\_i \leq T+len\_i$) wherein the time T indicates a time when the number n of chunks stored in the buffer is increased in the last time, and CNT is added to the number n of chunks that are currently stored in the buffer.

Step 602) The number n of chunks that are currently stored in the buffer is decremented by 1.

Step 603) The number n of chunks that are currently stored in the buffer is compared with the threshold $th\_s$ of the number of chunks at which playback halts. If n is greater, it is estimated that the content is in a playback state, and if n is equal to or less than $th\_s$, it is estimated that the content is in a halt state.

Step 604) Also, for various variables, T is increased by len_i (T=T+len_i), i is incremented by 1 (i=i+1), and updated.

Step 605) In chunks that form the content, when all of the files described in the content list are not processed or when a predetermined number of chunks are not processed, it is determined that there is an unprocessed chunk, and if the state is determined to be the playback state in step 603, the process goes to step 601. On the other hand, in a case where there is an unprocessed chunk and the state is determined to be the halt state in step 603, the process goes to step 606. When all of the chunks have been processed, the process goes to step 610. The content list includes, at least, a content identifier (ID), and a chunk identifier (ID) for each chunk included in the content, and when the chunk that is a current target of processing is not the last chunk, it is determined that there is an unprocessed chunk.

Step 606) If there is an unprocessed chunk and the state is the halt state, T is increased to a time when a next chunk is obtained (update the value of T), and the number n of chunks that are currently stored in the chunk is incremented by 1.

Step 607) The number n of chunks that are currently stored in the buffer is compared with the threshold th_r of the number of chunks by which playback restarts. When n is greater than th_r, the process goes to step 608, and when n is equal to th_r or less than th_r, the process goes to step 609.

Step 608) It is estimated that the state changes to a playback state.

Step 609) It is estimated that the state is the halt state as before.

Step 610) After that, all chunks are determined to be in the playback state, and a series of playback states of each time are output.

An example of the above-mentioned flowchart is shown by using a concrete example.

FIG. 15A and FIG. 15B show the concrete example. FIG. 15A shows a prerequisite, and FIG. 15B shows transitions of operation.

When the chunk number i is i=1, the process starts from determination after playback of the first chunk completes. At the time of start, n is equal to th_p, which is 5.

The number of chunks is counted, in which, the number of chunks correspond to [time t_5 (absolute value) at which the number of chunks is increased last time=10<obtaining time (absolute value)≤T+len_1=12]. Since t_6 applies, n=n+1=6 is calculated (step 601). 1 is subtracted from the number 6 of chunks currently stored in the buffer (n=6−1=5) (step 602). Accordingly, since n=5 is greater than th_s=3, the state is determined to be a playback state (step 603, Yes). T=T+len_1=12, i=2 are set (step 604). Since there is an unprocessed chunk, and the state is determined to be the playback state, the process returns to step 601 (step 605).

As a second process, the number of chunks is counted, in which, the number of chunks corresponds to [time t_6 (absolute value) at which the number of chunks is increased last time=12<obtaining time (absolute value)≤T+len_2=14]. But, in this case, since t_7 does not apply, adding to the number of chunks is not performed (step 601), and n=5−1=4 is calculated (step 602). Since n=4 which is greater than th_s=3, the state is determined to be a playback state (step 603, Yes).

As a third process, the number of chunks is counted, in which, the number of chunks corresponds to [time t_6 (absolute value) at which the number of chunks is increased last time=12<obtaining time (absolute value)≤T+len_3=16]. But, in this case, since t_7 does not apply, adding to the number of chunks is not performed (step 601), and n=4−1=3 is calculated (step 602). Since n=3 which is equal to th_s=3, the state is determined to be a halt state (step 603, No). T is set to t+len_3=16 and i=4 (step 604). Since there is an unprocessed chunk, T is updated to the next chunk obtaining time. In this case, T becomes 17. That is, the chunk of the number i=3 was played during 14-16 seconds, but the state becomes the halt state at 16 seconds.

Since the current state is the halt state, a next chunk is obtained, and T=t_7 becomes 17 (absolute value) and n becomes n+1=3+1=4 (step 606). Since n is 4, when it is compared with the threshold th_r (=4) of the number of chunks when playback restarts, 4≤4 is obtained. Since they are the same, the state is determined to be the halt state (step 607).

T is update to 18 which is the next chunk obtaining time, and the next chunk is obtained. Since T is t_8 (absolute value)=18, n is set to be n+1=4+1=5 (step 606). When n=5 is compared with th_r(=4), since n is greater than 4, the state is determined to be a playback state (step 607).

Next, the process moves to step 601, and the number of chunks is counted, in which, the number of chunks corresponds to [time t_8 (absolute value) at which the number of chunks is increased last time=18<obtaining time (absolute value)≤T+len_4=18]. But, in this case, since t_9 does not apply, the number of chunks is not increased (step 601), and n is calculated as 5−1=4 (step 602). Since n=4 which is greater than 3 (th_s), the state is determined to be a playback state (step 603, Yes). T is set as T+len_4==18 and i=5 (step 604). Since there is an unprocessed chunk and the current state is the playback state (step 605), the process goes to step 601.

In step 601, the number of chunks is counted, in which, the number of chunks corresponds to [time t_8 (absolute value) at which the number of chunks is increased last time=18<obtaining time (absolute value)≤T+len_5=20], and since n+2=7, t_9 and 10 apply in this case, and n is set as 7−1=6 (step 601). Since 6(n) is greater than 3 (th_s), the state is determined to be a playback state (step 603, Yes). T is set as T+len_5=20 and i=6 (step 604). Since there is an unprocessed chunk and the current state is the playback state, the process goes to step 601.

It becomes possible to obtain statistical information such as total halt time and halt number of times and the like based on the playback state determination result which is derived as mentioned above. By the way, obtaining statistical information can be realized by using an existing technique, and it is out of range of the present invention, so the description is not given.

Also, the various thresholds may be values that dynamically change according to the playback state or the number of halt times and the like.

Also, when it is difficult for the chunk obtaining time estimation unit 742 to obtain the time length from packet data, a value derived from time intervals for obtaining chunks may be used as the chunk time length.

[Embodiment 2-2]

In the embodiment 2-1, estimation of playback states can be performed by estimating transitions of the number of obtained chunks. But, in a case where the state is determined to be the halt state based on capture data, it is not considered whether the playback halt is caused by the network or caused by behavior of the user.

In the present embodiment, following processing is performed in order to estimate whether the cause of the playback halt is based on the network or behavior of the user.

Figure 16:
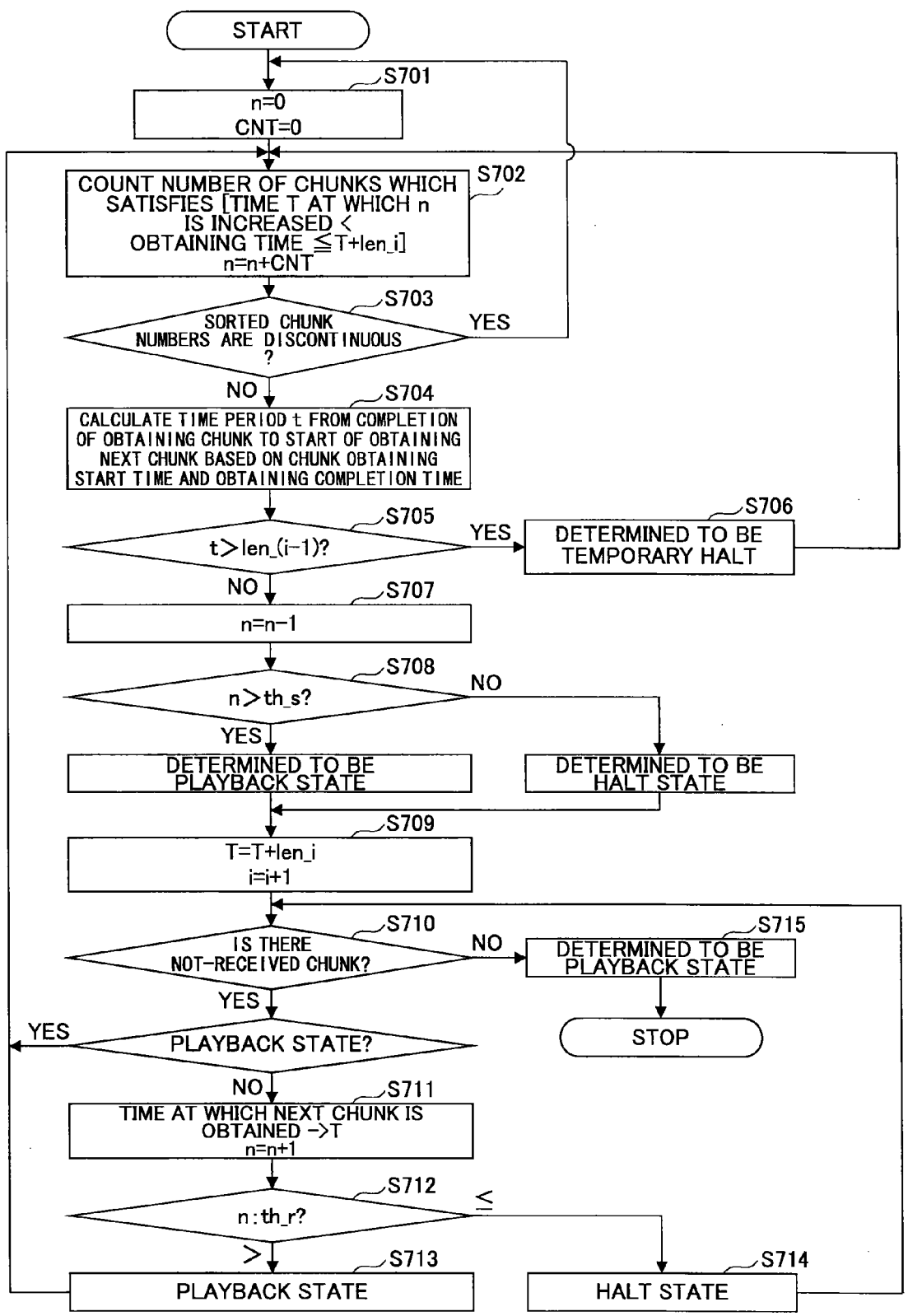
FIG. 16 is a flowchart of a halt estimation procedure in an embodiment 2-2.

FIG. 16 is a flowchart of the halt estimation procedure in the embodiment 2-2.

Step 701) The counter n and CNT are initialized such that n=0, and CNT=0.

Step 702) In the list that records obtaining time of each chunk, the number of chunks is counted in which, obtaining time is greater than a time T and equal to or less than T+len_i (T<t_i≤T+len_i) wherein the time T indicates a time when the number n of chunks stored in the buffer is increased in the last time, and the counted number is added to the number n of chunks that are currently stored in the buffer.

Step 703) For chunks for adding in step 702, it is determined whether chunk numbers of i-th chunk and (i+1)-th chunk are discontinuous (the increased number of chunk is not 1) when the obtaining start times are sorted in a time series manner. If the numbers are continuous, the process goes to step 704, and if the chunk numbers are discontinuous, the process goes to step 701 to reset each counter since it is determined that fast-forward or fast-rewind to outside of the range of the stored chunk occurs by the user operation. Also, determination in this flow is terminated, and estimation starts from the detected discontinuous number ((i+1)-th).

step 704) For each chunk that is the target for adding in step 702, a time period t from completion of obtaining of a chunk to start of obtaining a next chunk is calculated based on the chunk obtaining start time and the obtaining completion time.

Step 705) If the time t calculated in step 704 is greater than a playback time length len_(i−1) of a chunk that is played right before by a certain amount ($\alpha$), it is determined that playback is temporarily halted, then the process goes to step 706.

The certain amount ($\alpha$) is a value for absorbing an error between the estimated playback time and the actual playback time of each chunk. As the certain amount, the chunk playback time itself which is the length of playback time of the chunk may be used, or a fixed value such as 1.1 times may be used, or a constant time length may be used, or a value considering dispersion of network delay time may be used. Accuracy changes according to how to determine the certain amount of time. In order to improve the accuracy, it is necessary to set the amount by having a width for allowing an error (gap) between the assumed chunk playback time length and the actual time length. On the other hand, it is necessary that the amount is an error smaller than a minimum time length that is desired to be identified as user operation. Therefore, it is desirable to use a fixed time length around 1 second as $\alpha$. Also, an optimum value may be determined by performing evaluation for each service.

Step 706) In a case where playback is temporarily halted in step 705, the data amount stored in the buffer is not decreased. Also, the start time at which decrease of the buffer is stopped may be set as any time point from a value obtained by adding the chunk time length to the obtaining start time rr_j of the last received chunk, to a value obtained by adding the chunk time length to the obtaining complete time rs_j of the last received chunk. For example, if rr_j−rs_j is smaller than the chunk time length, the start time at which decrease of the buffer is stopped is set to be rs_j+chunk time length/2 and, if rr_j−rs_j is greater than the chunk time length, rr_i may be used. Also, when obtaining a next new chunk starts, the process goes to step 702.

In a video distribution service using chunks, obtaining a new chunk is closely related to playback states. Especially, in a terminal, when there is an upper limit of the number of chunks that can be stored before playback or there is an upper limit of the playback time length, a chunk is not obtained unless playback of a chunk which is being played completes. Therefore, by focusing on a time period from completion of chunk download to start of next chunk download, it becomes possible to determine that temporal halt is caused by user operation when the time required for start of chunk playback to the end of chunk playback is longer than the chunk playback time length which is the length of the playback time of the chunk (step 705, Yes).

Also, in a case where user operation is not related, the content is played in an predetermined order. Therefore, the chunk numbers surely become continuous. Thus, if the chunk numbers become discontinuous (step 703, Yes), it is determined that user operation is performed.

Step 707) The number n of chunks that are currently stored in the buffer is decremented by 1.

Step 708) The number n of chunks that are currently stored in the buffer is compared with the threshold th_s of the number of chunks at which playback halts. If n is greater, it is estimated that the content is in a playback state, and if n is equal to or less than th_s, it is estimated that the state becomes a halt state.

Step 709) Also, for various variables, T is increased by len_i (T=T+len_i), i is incremented by 1 (i=i+1), to be updated.

Step 710) In chunks that form the content, when all of the files described in the content list are not processed or when a predetermined number of chunks are not processed, it is determined that there is an unprocessed chunk, and if the state is determined to be the playback state in step 708, the process goes to step 702. On the other hand, in a case where there is an unprocessed chunk and the state is determined to be halt state in step 708, the process goes to step 711. When all of the chunks have been processed, the process goes to step 715. The content list includes, at least, a content identifier (ID), and a chunk identifier (ID) for each chunk included in the content, and when the chunk that is a current target of processing is not the last chunk, it is determined that there is an unprocessed chunk.

Step 711) If there is an unprocessed chunk and the state is the halt state, T is increased to a time when a next chunk is obtained (update the value of T), and the number n of chunks that are currently stored in the chunk is incremented by 1.

Step 712) The number n of chunks that are currently stored in the chunk is compared with the threshold th_r of the number of chunks by which playback restarts. When n is greater than th_r, the process goes to step 713, and when n is equal to th_r or less than th_r, the process goes to step 714.

Step 713) It is estimated that the state changes to a playback state.

Step 714) It is estimated that the state is the halt state as before.

Step 715) After that, all chunks are determined to be in a playback state, and a series of playback states of each time is output.

A concrete example of the above-mentioned flowchart is shown by using FIG. 15A and FIG. 15B in the same way as the embodiment 2-1.

In the same way as the embodiment 2-1, when the chunk number i is i=1, the process starts from determination after playback of the first chunk.

The number of chunks is counted, in which, the number of chunks correspond to [time t_5 (absolute value) at which the number of chunks is increased last time=10<obtaining time (absolute value)≤T+len_1=12]. Since t_6 applies, n=n+

1=6 is calculated (step 702). 1 is subtracted from the number 6 of chunks currently stored in the buffer (n=6−1=5) (step 707). Accordingly, since n=5 is greater than th_s=3, the state is determined to be a playback state (step 708, Yes). T=T+len_1=12, i=2 are set (step 709). Since there is an unprocessed chunk, and the state is determined to be the playback state, the process returns to step 702 (step 710).

As a second process, the number of chunks is counted, in which, the number of chunks corresponds to [time t_6 (absolute value) at which the number of chunks is increased last time=12<obtaining time (absolute value)≤T+len_2=14]. But, in this case, since t_7 does not apply, adding to the number of chunks is not performed (step 702), and n=5−1=4 is calculated (step 707). Since n=4 which is greater than th_s=3, the state is determined to be the playback state (step 708, Yes).

As a third process, the number of chunks is counted, in which, the number of chunks corresponds to [time t_6 (absolute value) at which the number of chunks is increased last time=12<obtaining time (absolute value)≤T+len_3=16]. But, in this case, since t_7 does not apply, adding to the number of chunks is not performed (step 702), and n=4−1=3 is calculated (step 707). Since n=3 which is equal to th_s=3, the state is determined to be a halt state (step 708, No). T is set as t+len_3=16 and i=4 (step 709). Since there is an unprocessed chunk, T is updated to a next chunk obtaining time. In this case, T becomes 17. That is, the chunk of the chunk number i=3 was played during 14-16 seconds, but the state becomes the halt state at 16 seconds.

Since the current state becomes the halt state, a next chunk is obtained, and T=t_7 becomes 17 (absolute value) and n becomes n+1=3+1=4 (step 711). Since n is 4, when it is compared with the threshold th_r (=4) of the number of chunks when playback restarts, 4≤4 is obtained. Since they are the same, the state is determined to be the halt state (step 712).

T is update to 18 which is the next chunk obtaining time, and the next chunk is obtained. Since T is t_8 (absolute value)=18, n is set to be n+1=4+1=5 (step 711). When n=5 is compared with th_r(=4), since n is greater than 4, the state is determined to be a playback state (step 712).

Next, the process moves to step 702, and the number of chunks is counted, in which, the number of chunks corresponds to [time t_8 (absolute value) at which the number of chunks is increased last time=18<obtaining time (absolute value)≤T+len_4=18]. But, in this case, since t 9 does not apply, the number of chunks is not increased (step 702), and n is calculated as 5−1=4 (step 707). Since n=4 which is greater than 3 (th_s), the state is determined to be a playback state (step 708, Yes). T is set as T+len_4=18 and i=5 (step 709). Since there is an unprocessed chunk and the current state is the playback state (step 702), the process goes to step 702.

In step 702, the number of chunks is counted, in which, the number of chunks corresponds to [time t_8 (absolute value) at which the number of chunks is increased last time=18<obtaining time (absolute value)≤T+len_5=20]. Since n+2=7, t_9 and 10 apply in this case, and n is set as 7−1=6 (step 702). Since 6(n) is greater than 3 (th_s), the state is determined to be the playback state (step 708, Yes). T is set as T+len_5=20 and i=6 (step 709). Since there is an unprocessed chunk and the current state is the playback state, the process goes to step 702.

It becomes possible to obtain statistical information such as a total halt time and the halt number of times and the like based on the playback state determination result which is derived as mentioned above. By the way, obtaining statistical information itself can be realized by using an existing technique, and it is outside of the range of the present invention, so the description is not given.

Also, the various thresholds may be values that dynamically change according to the playback state or the number of halt times and the like.

Also, when it is difficult for the chunk obtaining time estimation unit 742 to obtain the time length from packet data, a value derived from time intervals for obtaining chunks may be used as the chunk playback time length.

In a video service using chunks, chunks are downloaded before playback, and playback starts after a certain number of chunks are stored. Also, once playback starts, playback continues when there is a certain number of un-played chunks that are already obtained, but, when the number of the un-played chunks falls below the certain number, playback is halted. For example, when the number of un-played chunks that are already obtained is 0 and a chunk to be played next is being downloaded, playback cannot be continued. Thus, the state becomes a temporary halt state.

Therefore, by estimating transitions of the number of obtained chunks, it becomes possible to estimate playback states. The timing at which the number of obtained chunks changes is limited to a case where a new chunk is obtained and a case where playback of a chunk that is being played completes. Thus, the former case is estimated from capture data and the latter case is estimated based on an bit rate and an elapsed time of content so that the number of un-played chunks that have been obtained is estimated.

[Embodiment 2-3]

Figure 17:
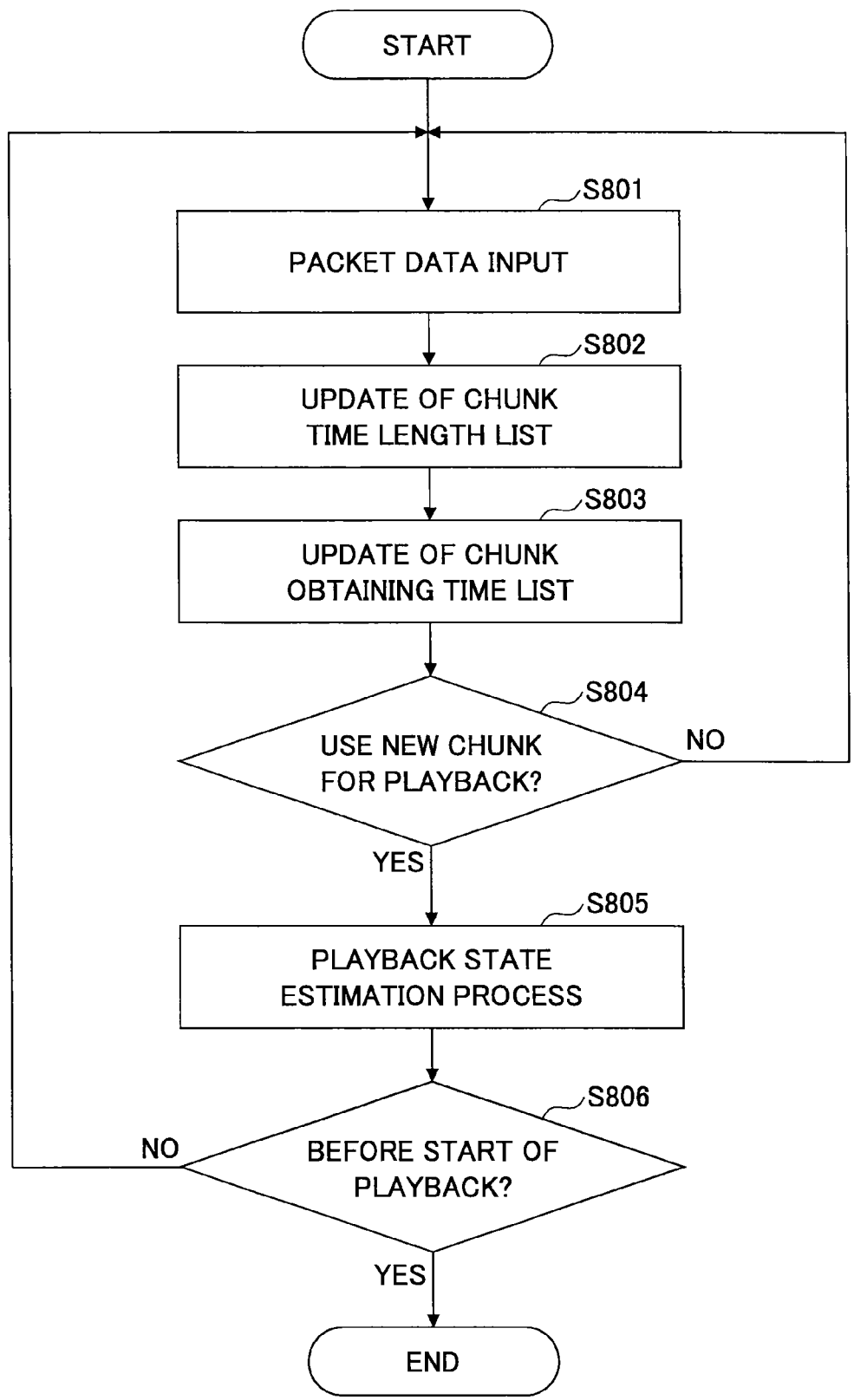
FIG. 17 is a flowchart showing an outline of operation in an embodiment 2-3.

FIG. 17 is a flowchart of operation in the embodiment 2-3.

In the embodiments 2-1 and 2-2, the time length list and obtaining time list are generated beforehand from capture data. On the other hand, in the present embodiment, update of the two lists is performed in an random order each time when capture data is input. At a time when a playback time of T+len_i has elapsed, the playback state estimation unit 730 performs its processes so as to update the target time T at which playback state estimation is newly performed. In the flowchart of FIG. 17, "use a new chunk for playback" (step 804) includes following two meanings:

playing a chunk in the playback buffer by incrementing i when the state is in a playback state; and obtaining data of a new chunk when the state is in a halt state.

[Embodiment 2-4]

The chunk time length estimation unit 741 of the embodiments 2-1 and 2-2 estimates a playback time length of a chunk from a received byte amount and a playback rate, instead of directly obtaining the time. The received byte amount of the chunk can be easily obtained when the packet information obtaining unit 710 outputs information for each chunk. Also, the playback rate may be a rate defined by a predetermined identifier (for example, a character string and the like indicating an image quality size in a URL indicating a content list or a chunk). Also, a rate that is directly described in the content list may be used.

As mentioned above, in the embodiment 2, packet data is obtained on a route between the distribution server and the playback terminal in the content distribution system, and playback information is estimated based on the information, so that playback information can be obtained without modifying the distribution system.

It is possible to construct operation of each component of the content playback information estimation apparatus of FIG. 12 as a program, and to install and run the program in a computer used as the content playback information estimation apparatus, or to distribute the program via a network.

That is, the content playback information estimation apparatus of FIG. 12 can be realized by causing a computer to execute a program describing processing content described in the present embodiment 2. More specifically, functions of each unit of the content playback information estimation apparatus can be realized by executing a program corresponding to processes performed by each unit, by using hardware resources such as a CPU, a memory and a hard disk included in the computer that forms the content playback information estimation apparatus. It is possible to preserve and distribute the program by recording the program in a computer readable recording medium (such as a portable memory). Also, it is possible to provide the program via a network such as the Internet and an email.

The present invention is not limited to the specifically disclosed embodiments, and variations and modifications may be made without departing from the scope of the claims.

The present international application claims priority based on Japanese patent application No. 2011-241173 filed on Nov. 2, 2011, Japanese patent application No. 2012-31125 filed on Feb. 15, 2012 and Japanese patent application No. 2012-150926 filed on Jul. 4, 2012, and the entire contents of the Japanese patent applications No. 2011-241173, No. 2012-31125 and No. 2012-150926 are incorporated herein by reference.

DESCRIPTION OF REFERENCE SIGNS 100 content playback information estimation apparatus
110 packet information obtaining unit
120 content received amount estimation unit
130 playback start time estimation unit
140 playback state estimation unit
150 playback halt time estimation unit
200 playback terminal
210 playback buffer
300 content storing apparatus
310 content transmission unit
320 content storing unit
400 content playback information estimation apparatus
110 packet information obtaining unit
410 buffer parameter estimation unit
500 content playback information estimation apparatus
510 playback rate estimation unit
600 content playback information estimation apparatus
610 content information estimation unit
10 distribution server
20 terminal
700 content playback information estimation apparatus
720 storage unit
730 playback state estimation unit
740 chunk state estimation unit
741 chunk time length estimation unit
742 chunk obtaining time estimation unit

The invention claimed is:

1. A content playback information estimation apparatus, in a system, for estimating a playback halt state of content data in a terminal, the content playback information estimation apparatus comprising:
a packet information obtaining unit configured to obtain packet information sent and received via a network;
a content received amount estimation unit configured to estimate time-series information of an amount of content data received at each time in a playback terminal based on time-series information of the packet information;
a playback start time estimation unit configured to estimate a time period required for starting playback in the playback terminal by using the amount of content data estimated by the content received amount estimation unit;
a playback state estimation unit configured to estimate, by using the amount of content data, whether a state in the playback terminal is in a playback state or in a halt state at each time based on a data amount that is consumed by a playback application of the playback terminal at each time period after start of playback; and
a playback halt time estimation unit configured, when the playback state estimation unit determines the state is in the halt state, to estimate a time at which playback is halted and a length of the halt, wherein
the system comprising a distribution server for performing content data distribution via the network, and the playback terminal for playing the content data received from the distribution server while storing the content data,
the playback terminal stores the content data in a playback buffer, starts playback when content data of an initial buffer amount is stored in the playback buffer, reads data required for playback from the playback buffer during playback, halts playback when a buffer amount stored in the playback buffer falls below a playback halt threshold, and starts playback when the buffer amount stored in the playback buffer exceeds a playback start threshold,
the playback state estimation unit performs processes, in each time, for increasing the buffer amount by an increased amount of received content data and decreasing the buffer amount by a data amount consumed by the playback application,
the playback state estimation unit determines that the state changes to the halt state when the buffer amount falls below the playback halt threshold in the playback state, and
the playback state estimation unit determines that the state changes to the playback state when the buffer amount exceeds the playback start threshold in the halt state in which the data amount consumed by the playback application is 0.

2. The content playback information estimation apparatus as claimed in claim 1, further comprising:
a buffer parameter estimation unit configured to estimate a buffer parameter based on the packet information,
the playback state estimation unit comprising a unit configured to estimate whether the state in the playback terminal is in the playback state based on the time series-information of the amount of content data estimated by the content received amount estimation unit and the buffer parameter estimated by the buffer parameter estimation unit.

3. The content playback information estimation apparatus as claimed in claim 1, further comprising:
a playback rate estimation unit configured to estimate, based on the packet information, a data amount that is read out from the playback buffer in each playback time of content data received by the playback terminal,
the playback start time estimation unit comprising a unit configured to estimate the time required for start of playback by using the data amount estimated by the playback rate estimation unit.

4. The content playback information estimation apparatus as claimed in claim 1, further comprising:
a first content information estimation unit configured to estimate a data amount that is read out from the playback buffer at each playback time based on a total amount of content data, received by the playback terminal, of the packet information and a playback time length of the content,
the playback state estimation unit comprising a unit configured to estimate whether the state in the playback terminal is in the playback state or in the halt state by using the data amount estimated by the first content information estimation unit.

5. The content playback information estimation apparatus as claimed in claim 1, further comprising:
a second content information estimation unit configured to estimate a data amount that is read out from the playback buffer at each playback time based on a predetermined playback rate fixed value for each content and content data received by the playback terminal,
the playback state estimation unit comprising a unit configured to estimate whether the state in the playback terminal is in the playback state or in the halt state by using the data amount estimated by the second content information estimation unit.

6. A content playback information estimation method, in a system, for estimating a playback halt state of content data in a terminal, the content playback information estimation method comprising:
a packet information obtaining step in which a packet information obtaining unit obtains packet information sent and received via a network;
a content received amount estimation step in which a content received amount estimation unit estimates time-series information of an amount of content data received at each time in a playback terminal based on time-series information of the packet information;
a playback start time estimation step in which a playback start time estimation unit estimates a time period required for starting playback in the playback terminal by using the amount of content data estimated by the content received amount estimation step;
a playback state estimation step in which a playback state estimation unit estimates, by using the amount of content data, whether a state in the playback terminal is in a playback state or in a halt state at each time based on a data amount that is consumed by a playback application of the playback terminal at each time period after start of playback; and
a playback halt time estimation step in which a playback halt time estimation unit, when the playback state estimation step determines the state is in the halt state, estimates a time at which playback is halted and a length of the halt, wherein
the system comprising a distribution server for performing content data distribution via the network, and the playback terminal for playing the content data received from the distribution server while storing the content data,
the playback terminal stores the content data in a playback buffer, starts playback when content data of an initial buffer amount is stored in the playback buffer, reads data required for playback from the playback buffer during playback, halts playback when a buffer amount stored in the playback buffer falls below a playback halt threshold, and starts playback when the buffer amount stored in the playback buffer exceeds a playback start threshold, and
in the playback state estimation step, the playback state estimation unit:
performs processes, in each time, for increasing the buffer amount by an increased amount of received content data and decreasing the buffer amount by a data amount consumed by the playback application,
determines that the state changes to the halt state when the buffer amount falls below the playback halt threshold in the playback state, and
determines that the state changes to the playback state when the buffer amount exceeds the playback start threshold in the halt state in which the data amount consumed by the playback application is 0.

7. A non-transitory computer-readable recording medium storing a content playback information estimation program for causing a computer to function as each unit of the content playback information estimation apparatus as claimed in claim 1.

* * * * *